(12) United States Patent
Shirasaka et al.

(10) Patent No.: US 9,070,917 B2
(45) Date of Patent: Jun. 30, 2015

(54) METHOD OF CONTROLLING FUEL CELL SYSTEM

(75) Inventors: Takuya Shirasaka, Sakura (JP); Hibiki Saeki, Utsunomiya (JP); Kazunori Watanabe, Mooka (JP); Shuichi Kazuno, Utsunomiya (JP)

(73) Assignee: HONDA MOTOR CO., LTD., Tokyo (JP)

( * ) Notice: Subject to any disclaimer, the term of this patent is extended or adjusted under 35 U.S.C. 154(b) by 425 days.

(21) Appl. No.: 13/605,220

(22) Filed: Sep. 6, 2012

(65) Prior Publication Data

US 2013/0063072 A1 Mar. 14, 2013

(30) Foreign Application Priority Data

Sep. 9, 2011 (JP) ................. 2011-196603

(51) Int. Cl.
*H01M 8/04* (2006.01)
*H01M 16/00* (2006.01)

(52) U.S. Cl.
CPC .............. *H01M 8/0488* (2013.01); *Y02E 60/50* (2013.01); *H01M 16/006* (2013.01); *H01M 8/04753* (2013.01); *B60L 2200/26* (2013.01)

(58) Field of Classification Search
USPC ................. 320/101; 429/21, 22, 23, 432
See application file for complete search history.

(56) References Cited

U.S. PATENT DOCUMENTS

| 2005/0233192 A1 | 10/2005 | Ishikawa et al. |
| 2007/0088483 A1 | 4/2007 | Yoshida |
| 2009/0029197 A1 | 1/2009 | Hibino et al. |
| 2009/0068514 A1 | 3/2009 | Aso et al. |
| 2009/0130510 A1 | 5/2009 | Ishikawa et al. |
| 2010/0055521 A1* | 3/2010 | Umayahara et al. ............ 429/23 |
| 2010/0068576 A1 | 3/2010 | Hamada et al. |

(Continued)

FOREIGN PATENT DOCUMENTS

| CN | 1898102 A | 1/2007 |
| CN | 101331636 A | 12/2008 |

(Continued)

OTHER PUBLICATIONS

Notice of Allowance, Patent Application No. 2011-196603, mailing date Jul. 2, 2013.

(Continued)

*Primary Examiner* — Thuan Do
*Assistant Examiner* — Brian Ngo
(74) *Attorney, Agent, or Firm* — Westerman, Hattori, Daniels & Adrian, LLP

(57) ABSTRACT

In a fuel cell system, regeneration-time voltage fixed control is implemented where during regeneration or when regeneration is expected to occur, output voltage of a fuel cell is set to a voltage value outside an oxidation reduction progress voltage range, and the amount of reactant gas supplied to the fuel cell is changed based on the amount of electric power remaining in an energy storage device. In the regeneration-time voltage fixed control, it is determined whether or not regeneration occurs while a moving body equipped with the fuel cell system is moving down a slope, and in the case where it is determined that regeneration occurs while the moving body is moving down a slope, the amount of the reactant gas supplied to the fuel cell is decreased in comparison with the case where it is determined that regeneration occurs while the moving body is not moving down a slope.

2 Claims, 25 Drawing Sheets

(56) References Cited

U.S. PATENT DOCUMENTS

2010/0291452 A1 11/2010 Imanishi et al.
2011/0018491 A1* 1/2011 Yoshida et al. ............... 320/101

FOREIGN PATENT DOCUMENTS

| CN | 101331639 A | 12/2008 |
| DE | 11 2008 002 094 T5 | 7/2010 |
| JP | 60-177565 A | 9/1985 |
| JP | 2007-005038 A | 1/2007 |
| JP | 2008-218398 A | 9/2008 |
| JP | 2009-089536 A | 4/2009 |
| JP | 2009-295516 A | 12/2009 |
| WO | 2004/055929 A1 | 7/2004 |

OTHER PUBLICATIONS

Office Action dated Jul. 1, 2014, issued in corresponding Chinese Patent Application No. 201210325779.5, with English Translation (8 pages).

German Office Action, German Patent Application No. 102012 215 935.5 mailing date Mar. 14, 2014.

German Search Report, German Patent Application No. 102012 215 935.5 mailing date Mar. 14, 2014.

* cited by examiner

METHOD OF CONTROLLING FUEL CELL SYSTEM

CROSS-REFERENCE TO RELATED APPLICATION

This application is based upon and claims the benefit of priority from Japanese Patent Application No. 2011-196603 filed on Sep. 9, 2011, of which the contents are incorporated herein by reference.

BACKGROUND OF THE INVENTION

1. Field of the Invention

The present invention relates to a method of controlling a fuel cell system which has a fuel cell and an energy storage device, and which is capable of regenerating electric power.

2. Description of the Related Art

In a conventional technique, a fuel cell system for suppressing degradation of a fuel cell used in a fuel cell vehicle or the like is proposed, and in the fuel cell system, power generation is performed in a manner that the oxidation reduction electrical potential is avoided (U.S. Patent Application Publication No. 2009/0029197 (hereinafter referred to as "US 2009/0029197 A1")). In the fuel cell system disclosed in US 2009/0029197 A1, even if electric power required by the system Wreq is increased gradually, the output voltage Vfc of the fuel cell is limited by the oxidation reduction potential Voxpt, and electric power corresponding to the limited voltage is compensated by a battery under control. Thereafter, even if it becomes unnecessary to perform power generation of the fuel cell, e.g., due to decrease in the opening degree of an accelerator pedal, the output voltage of the fuel cell is maintained at the oxidation reduction potential or less, and power generation is continued until the remaining battery level in the battery exceeds a predetermined value (abstract and FIG. 3).

Further, a fuel cell system aimed to effectively collect regenerative electric power has been developed (Japanese Laid-Open Patent Publication No. 2009-295516 (hereinafter referred to as "JP 2009-295516 A")). An object of JP 2009-295516 A is to provide a fuel cell system which is capable of collecting regenerative electric power from a traction motor as much as possible in a power system using a fuel cell and a battery in combination to supply electric power to the traction motor (abstract). Therefore, in the fuel cell system 20 of JP 2009-295516 A, as the regenerative electric power increases, the lower limit reference value of an output range of the fuel cell 1 is lowered, whereby output electric power of the fuel cell 1 is controlled within the output range (claim 1).

SUMMARY OF THE INVENTION

As described above, in the control of US 2009/0029197 A1, the output voltage of the fuel cell is maintained at the oxidation reduction potential Voxpt or less. In order to continuously avoid the oxidation reduction potential Voxpt, the output electric power of the fuel cell needs to be large in comparison with the electric power required by a load such as the traction motor. In this case, excessive electric power generated by the fuel cell is supplied to the battery for charging. Therefore, in order to continuously avoid the oxidation reduction potential Voxpt, the frequency of charging and discharging the battery becomes high. As the frequency of charging and discharging the battery increases, loss in electric power due to charging/discharging becomes large, and the output efficiency in the fuel cell system becomes low as a whole. The inventor of the present application confirmed that there is a certain range of potential where oxidation reduction reaction occurs. Hereinafter, the voltage range where reduction oxidation reaction occurs is referred to as the "oxidation reduction progress voltage range".

Further, in the control of JP 2009-295516 A, the lower limit reference value of the output range of the fuel cell 1 is decreased depending on the amount of the regenerative electric power. However, when the lower limit reference value of the output range is decreased, the output voltage of the fuel cell 1 is increased, and oxidation reduction or reduction reaction of catalyst (platinum) may proceed excessively to cause degradation of the fuel cell 1 undesirably. Further, if the electric power generated by the fuel cell 1 is decreased excessively by putting priority on collection of the regenerative electric power, in the case where the obtained regenerative electric power is smaller than it was expected, the remaining battery level in the battery may become excessively low.

The present invention has been made to take the problems of this type into account, and an object of the present invention is to provide a method of controlling a fuel cell system in which it is possible to suppress degradation of fuel cells, and effectively collect regenerative electric power.

According to the present invention, there is provided a method of controlling a fuel cell system, the method comprising the step of implementing regeneration-time voltage fixed control where during regeneration or when regeneration is expected to occur, output voltage of a fuel cell is fixed to a voltage value outside an oxidation reduction progress voltage range where oxidation reduction proceeds, and the amount of a reactant gas supplied to the fuel cell is changed based on the amount of electric power remaining in an energy storage device. In the regeneration-time voltage fixed control, it is determined whether or not regeneration occurs while a moving body equipped with the fuel cell system is moving down a slope, and in the case where it is determined that regeneration occurs while the moving body is moving down a slope, the amount of the reactant gas supplied to the fuel cell is decreased in comparison with the case where it is determined that regeneration occurs while the moving body is not moving down a slope.

In the present invention, it becomes possible to suppress degradation of the fuel cell, and effectively collect regenerative electric power.

That is, in the present invention, during regeneration or when regeneration is expected to occur, output voltage of the fuel cell is set to a voltage value outside the oxidation reduction progress voltage range where oxidation reduction proceeds. Therefore, it becomes possible to suppress degradation of the fuel cell.

Further, in the present invention, during regeneration, or when regeneration is expected to occur, the amount of the reactant gas supplied to the fuel cell is changed based on the amount of electric power remaining in the energy storage device (SOC of the energy storage device). Further, in the case where it is determined that regeneration occurs while the moving body is moving down, the amount of the reactant gas supplied to the fuel cell is decreased in comparison with the case where it is determined that regeneration occurs while the moving body is not moving down a slope (e.g., in the case of regeneration of electric power by deceleration on a flat road). Therefore, even if the SOC of the energy storage device is the same, the power generation amount of the fuel cell is small in the case where regeneration occurs while the moving body is moving down a slope, in comparison with the case where regeneration occurs in a state where the moving body is not moving down a slope.

In general, it is highly probable that regeneration of electric power while the moving body is moving down a slope continues for a long period of time in comparison with the case of regeneration of electric power while the moving body is decelerated on a flat road. The expression "regeneration of electric power while the moving body is moving down a slope" means regeneration of electric power caused by applying braking force for maintaining the velocity of the moving body, decelerating the moving body or reducing an increasing acceleration of the moving body while the moving body is moving down a slope (including reduction in the motor rotation number). While the moving body is moving down a slope, the potential energy of the moving body can be converted into regenerative electrical energy. Therefore, it is considered that the regenerative electric power tends to be large. Thus, in the case of regeneration of electric power while the moving body is moving down a slope, the energy storage device can be charged with larger electric power. When the fuel cell performs power generation separately from a regeneration power source such as a traction motor, a regeneration motor, etc., as a consequence, the energy storage device cannot be easily charged with the regenerative electric power, and the efficiency of collecting the regenerative electric power may be lowered undesirably. In the present invention, in the case of regeneration of electric power while the moving body is moving down a slope, the amount of reactant gas supplied to the fuel cell is decreased, and the power generation amount of the fuel cell is decreased. Therefore, while the moving body is moving down a slope, larger regenerative electric power can be supplied to the energy storage device for charging.

Further, in the case where a target value or a target range of the SOC of the energy storage is set, and charging/discharging of the energy storage device is controlled such that the SOC becomes equal to the target value or the SOC falls within the target range, if the output of the fuel cell is maintained, for example, the energy storage device may be excessively charged with regenerative electric power while the moving body is moving down a slope. In this case, the frequency of charging/discharging of the energy storage device is increased, and electric power loss occurs due to such repeated charging/discharging. As a result, the regeneration efficiency is decreased. In the present invention, in the case of regeneration of electric power while the moving body is moving down a slope, the amount of the reactant gas supplied to the fuel cell is decreased, and the power generation amount of the fuel cell is decreased. Thus, since the regenerative electric power with which the energy storage device is charged, instead of the electric power generated by the fuel cell, is increased, the amount of electric power remaining in the energy storage device can be made closer to the target value easily, or the amount of electric power remaining in the energy storage device can be maintained within the target range easily. Thus, it becomes possible to improve the regeneration efficiency.

In the case where it is determined that regeneration occurs while the moving body is moving down a slope, the output voltage of the fuel cell is set to a voltage value which is higher than the oxidation reduction progress voltage range where oxidation reduction proceeds, and in the case where it is determined that regeneration occurs while the moving body is not moving down a slope, the output voltage of the fuel cell is set to a value which is lower or higher than the oxidation reduction progress voltage range, depending on the amount of electric power remaining in the energy storage device.

In general, in the case where the reactant gas is supplied to the fuel cell at the stoichiometric ratio for normal power generation, as the output voltage of the fuel cell decreases, the output of the fuel cell becomes high. Further, as described above, in the case of regeneration of electric power while the moving body is moving down a slope, by suppressing the output of the fuel cell, it becomes possible to utilize the regenerative electric power further effectively. Further, in the case of regeneration of electric power while the moving body is moving down a slope, by setting a higher output voltage of the fuel cell, the output of the fuel cell becomes relatively low, and in the case of regeneration of electric power in a state where the moving body is not moving down a slope, by setting a lower output voltage of the fuel cell, the output of the fuel cell becomes relatively high. Thus, during regeneration of electric power while the moving body is moving down a slope, the amount of the reactant gas supplied to the fuel cell is decreased, and a suitable power generation depending on the amount of the supplied reactant gas can be performed. As a result, it becomes possible to improve the power generation efficiency of the fuel cell system.

The above and other objects, features and advantages of the present invention will become more apparent from the following description when taken in conjunction with the accompanying drawings in which preferred embodiments of the present invention are shown by way of illustrative example.

DESCRIPTION OF THE PREFERRED EMBODIMENTS

1. Description Regarding Overall Structure

[1-1. Overall Structure]

Figure 1:
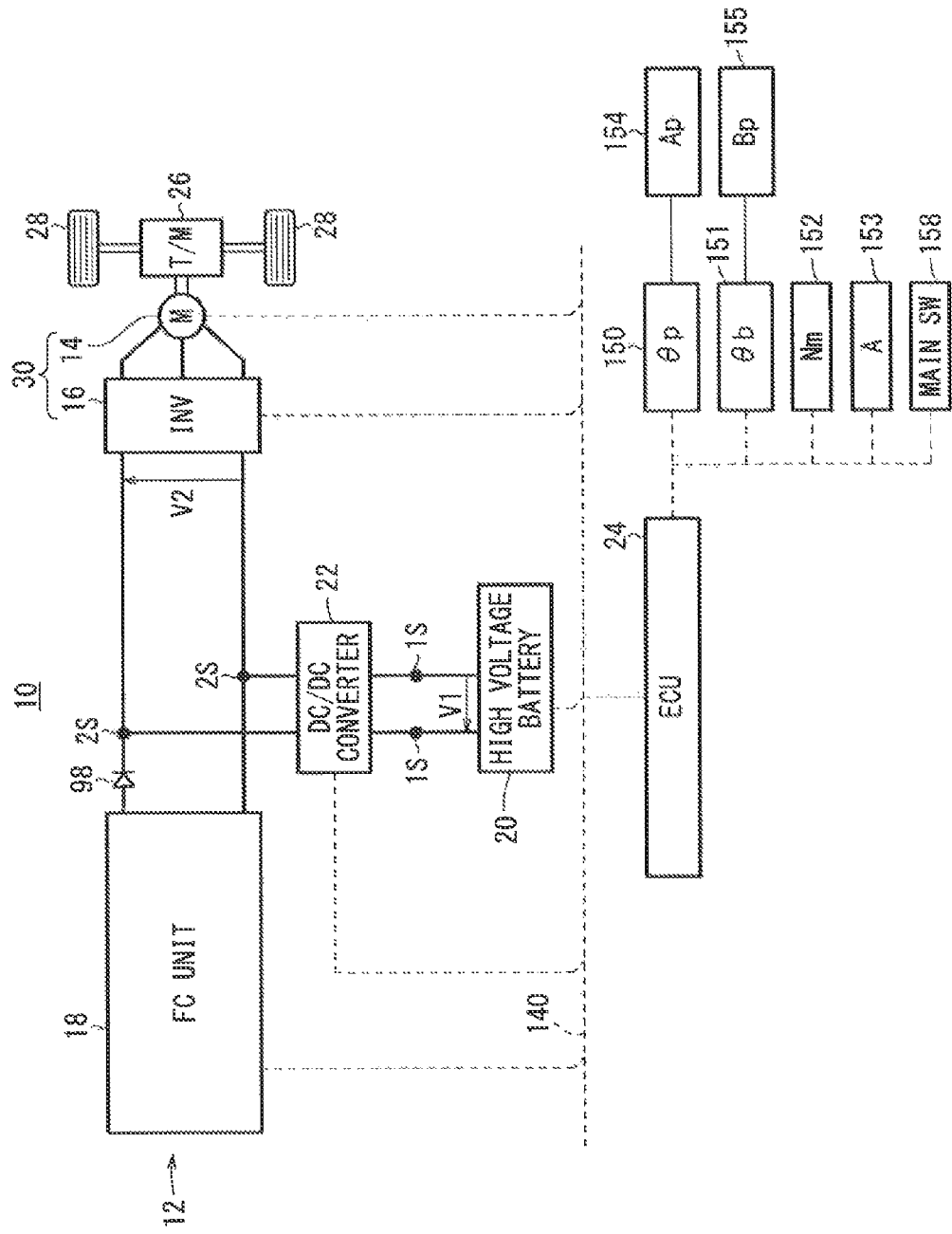
FIG. 1 is a diagram schematically showing an overall structure of a fuel cell vehicle equipped with a fuel cell system according to an embodiment of the present invention.
Figure 2:
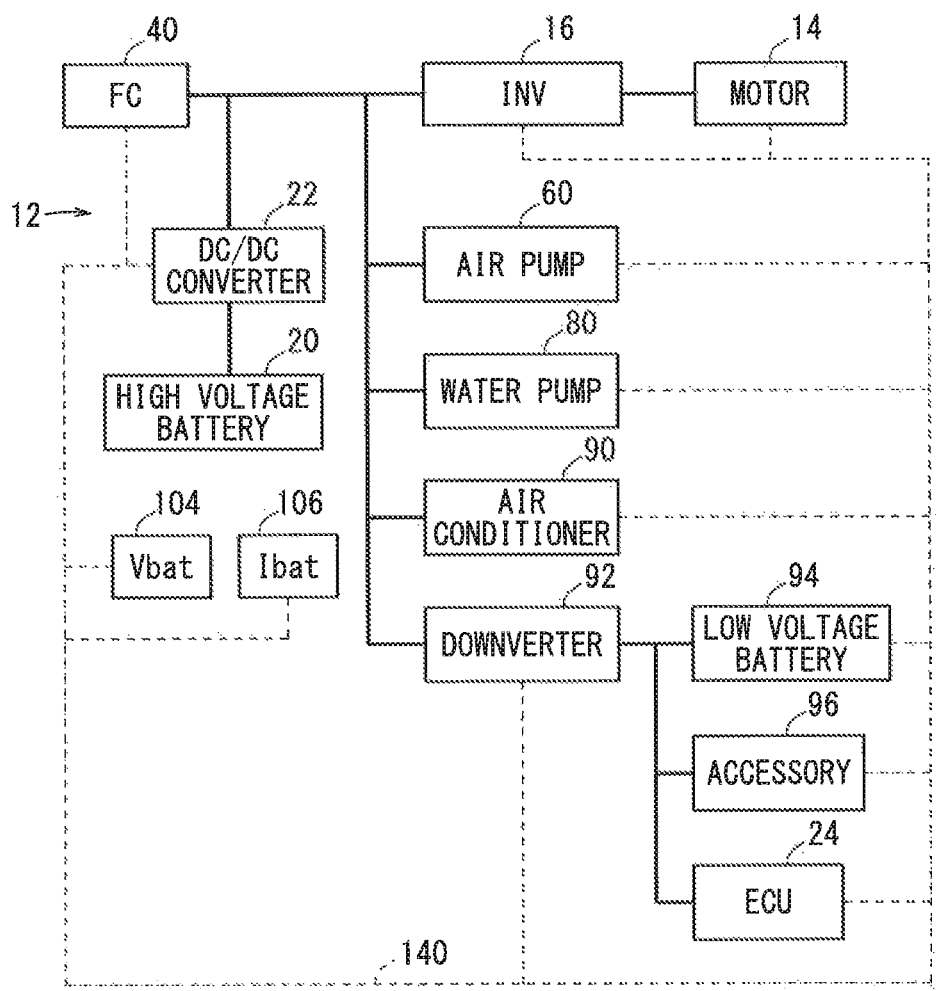
FIG. 2 is a block diagram showing a power system of the fuel cell vehicle.

FIG. 1 is a diagram schematically showing the overall structure of a fuel cell vehicle (moving body) 10 (hereinafter referred to as the "FC vehicle 10" or "vehicle 10") equipped with a fuel cell system 12 (hereinafter referred to as the "FC system 12") according to an embodiment of the present invention. FIG. 2 is a block diagram showing a power system of the FC vehicle 10. As shown in FIGS. 1 and 2, the FC vehicle 10 includes a traction motor 14 and an inverter (auxiliary device) 16 in addition to the FC system 12.

The FC system 12 includes a fuel cell unit 18 (hereinafter referred to as the "FC unit 18"), a high voltage battery (hereinafter referred to as the "battery 20") (energy storage device), a DC/DC converter 22, and an electronic control unit (control device) 24 (hereinafter referred to as the "ECU 24").

[1-2. Drive System]

The motor 14 generates a driving force based on the electric power supplied from the FC unit 18 and the battery 20, and rotates wheels 28 using the driving force through a transmission 26. Further, the motor 14 outputs electric power generated by regeneration (regenerative electric power Preg) [W] to the battery 20 or the like (see FIG. 2).

The inverter 16 has three phase bridge structure, and carries out DC/AC conversion to convert direct current into alternating current in three phases. The inverter 16 supplies the alternating current to the motor 14, and supplies the direct current after AC/DC conversion as a result of regeneration to the battery 20 or the like through a DC/DC converter 22.

It should be noted that the motor 14 and the inverter 16 are collectively referred to as a load 30. The load 30 may include components (auxiliary device) such as an air pump (reactant gas supply apparatus) 60, a water pump 80, and an air conditioner 90 as described later.

[1-3. FC System]

(1-3-1. Overall Structure)

Figure 3:
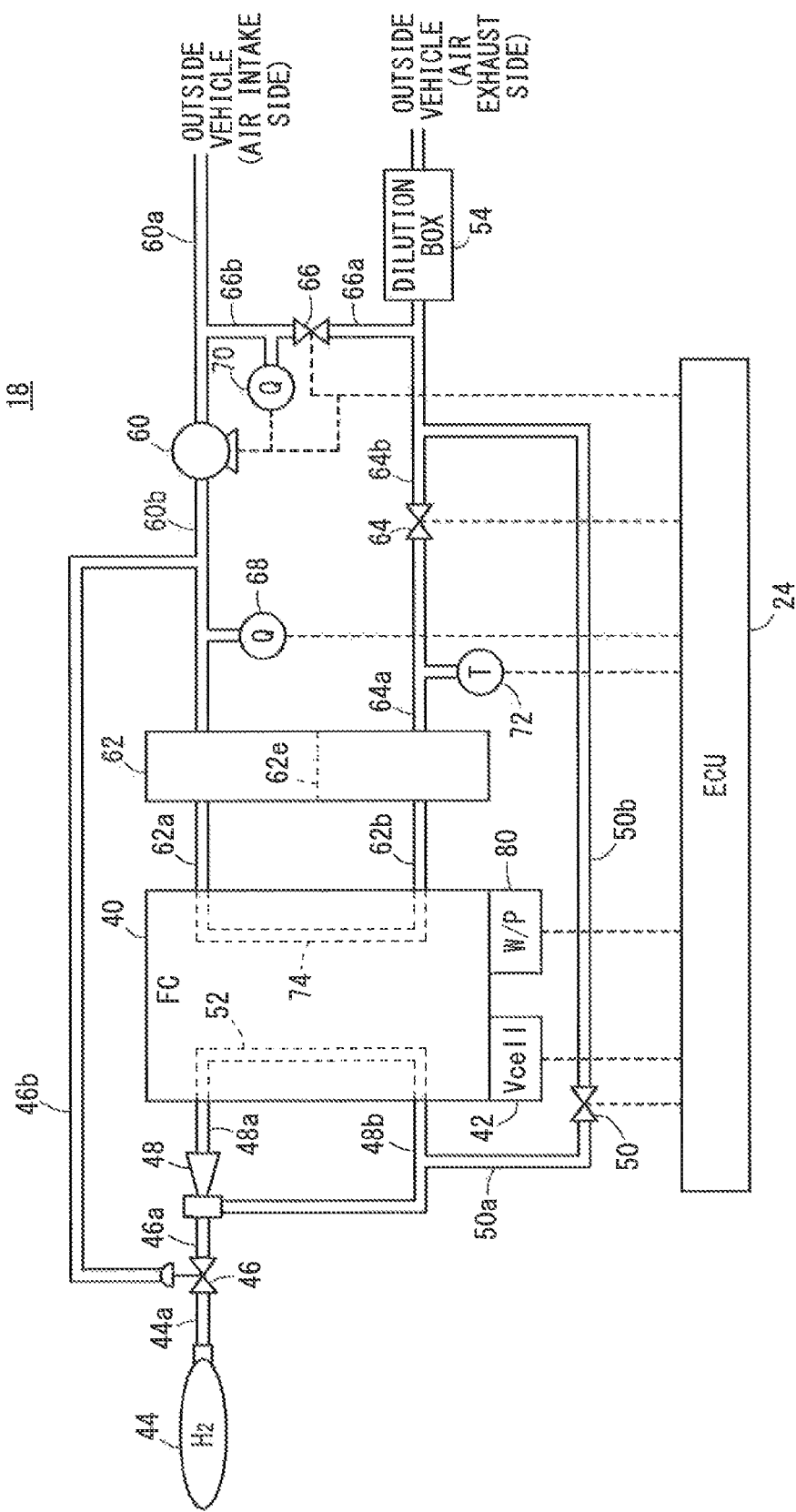
FIG. 3 is a diagram schematically showing a structure of a fuel cell unit according to the embodiment.

FIG. 3 is a diagram schematically showing a structure of the FC unit 18. The FC unit 18 includes a fuel cell stack 40 (hereinafter referred to as the "FC stack 40" or the "FC 40"), an anode system for supplying hydrogen (fuel gas) to, and discharging the hydrogen (fuel gas) from anodes of the FC stack 40, a cathode system for supplying the air (oxygen-containing gas) to, and discharging the air (oxygen-containing gas) from cathodes of the FC stack 40, a coolant system for cooling the FC stack 40, and a cell voltage monitor 42.

(1-3-2. FC Stack 40)

For example, the FC stack 40 is formed by stacking fuel cells (hereinafter referred to as the "FC cells") each including an anode, a cathode, and a solid polymer electrolyte membrane interposed between the anode and the cathode.

(1-3-3. Anode System)

The anode system includes a hydrogen tank 44 (reactant gas supply apparatus), a regulator 46, an ejector 48, and a purge valve 50. The hydrogen tank 44 contains hydrogen as the fuel gas. The hydrogen tank 44 is connected to the inlet of an anode channel 52 through a pipe 44a, a regulator 46, a pipe 46a, an ejector 48, and a pipe 48a. Thus, the hydrogen in the hydrogen tank 44 can be supplied to the anode channel 52 through the pipe 44a or the like. A shut-off valve (not shown) is provided in the pipe 44a. At the time of power generation of the FC stack 40, the shut-off valve is opened by the ECU 24.

The regulator 46 regulates the pressure of the supplied hydrogen to a predetermined value, and discharges the hydrogen. That is, the regulator 46 regulates the pressure on the downstream side (pressure of the hydrogen on the anode side) in response to the pressure (pilot pressure) of the air on the cathode side supplied through a pipe 46b. Therefore, the pressure of the hydrogen on the anode side is linked to the pressure of the air on the cathode side. As described later, by changing the rotation number or the like of the air pump 60 so as to change the oxygen concentration, the pressure of the hydrogen on the anode side changes as well.

The ejector 48 generates a negative pressure by ejecting hydrogen from the hydrogen tank 44 through a nozzle. By this negative pressure, the anode off gas can be sucked from a pipe 48b.

The outlet of the anode channel 52 is connected to a suction port of the ejector 48 through the pipe 48b. The anode off gas discharged from the anode channel 52 flows through the pipe 48b and again into the ejector 48 to allow circulation of the anode off gas (hydrogen).

The anode off gas contains hydrogen that has not been consumed in the electrode reaction at the anodes, and water vapor. Further, a gas-liquid separator (not shown) is provided at the pipe 48b for separating/recovering water components (condensed water (liquid) and water vapor (gas)) in the anode off gas.

Part of the pipe 48b is connected to a dilution box 54 provided in a pipe 64b as described later, through a pipe 50a, a purge valve 50, and a pipe 50b. When it is determined that power generation of the FC stack 40 is not performed stably, the purge valve 50 is opened for a predetermined period in accordance with an instruction from the ECU 24. In the dilution box 54, the hydrogen in the anode off gas from the purge valve 50 is diluted by the cathode off gas.

(1-3-4. Cathode System)

The cathode system includes the air pump 60, a humidifier 62, a back pressure valve (reactant gas supply apparatus) 64, a circulation valve (reactant gas supply apparatus) 66, flow rate sensors 68, 70, and a temperature sensor 72.

The air pump 60 compresses the external air (air), and supplies the compressed air to the cathode. A suction port of the air pump 60 is connected to the outside (outside of the vehicle) through a pipe 60a, and an ejection port of the air pump 60 is connected to the inlet of a cathode channel 74 through a pipe 60b, the humidifier 62, and a pipe 62a, When the air pump 60 is operated in accordance with an instruction from the ECU 24, the air pump 60 sucks the air outside the vehicle through the pipe 60a, compresses the sucked air, and supplies the compressed air to the cathode channel 74 through the pipe 60b or the like under pressure.

The humidifier 62 has a plurality of hollow fiber membranes 62e having water permeability. The humidifier 62 humidifies the air flowing toward the cathode channel 74 through the hollow fiber membranes 62e by exchanging water components between the air flowing toward the cathode channel 74 and the highly humidified cathode off gas discharged from the cathode channel 74.

A pipe 62b, the humidifier 62, a pipe 64a, the back pressure valve 64, and the pipe 64b are provided at the outlet of the cathode channel 74. The cathode off gas (oxygen-containing off gas) discharged from the cathode channel 74 is discharged to the outside of the vehicle through the pipe 62b or the like.

For example, the back pressure valve 64 is a butterfly valve, and the opening degree of the back pressure valve 64 is controlled by the ECU 24 to regulate the pressure of the air in the cathode channel 74. More specifically, if the opening degree of the back pressure valve 64 becomes small, the pressure of the air in the cathode channel 74 is increased, and oxygen concentration per volume flow rate (volume concentration) becomes high. Conversely, if the opening degree of the back pressure valve 64 becomes large, the pressure of the air in the cathode channel 74 is decreased, and oxygen concentration per volume flow rate (volume concentration) becomes low.

The pipe 64b is connected to the pipe 60a, which is positioned upstream of the air pump 60, through a pipe 66a, the circulation valve 66, and a pipe 66b. Thus, some of the exhaust gas (cathode off gas) is supplied as a circulating gas to the pipe 60a through the pipe 66a, the circulation valve 66, and the pipe 66b. The circulating gas is mixed with the fresh air from the outside of the vehicle, and sucked into the air pump 60.

For example, the circulation valve 66 is a butterfly valve, and the opening degree of the circulation valve 66 is controlled by the ECU 24 to regulate the flow rate of the circulating gas.

A flow rate sensor 68 is connected to the pipe 60b. The flow rate sensor 68 detects the flow rate [g/s] of the air flowing toward the cathode channel 74, and outputs the detected flow rate to the ECU 24. A flow rate sensor 70 is connected to the pipe 66b. The flow rate sensor 70 detects the flow rate QC [g/s] of the circulating gas flowing toward the pipe 60a, and outputs the detected flow rate to the ECU 24.

A temperature sensor 72 is connected to the pipe 64a. The temperature sensor 72 detects the temperature of the cathode off gas, and the temperature sensor 72 outputs the detected temperature to the ECU 24. Since the temperature of the circulating gas is substantially equal to the temperature of the cathode off gas, the temperature of the circulating gas can be detected based on the temperature of the cathode off gas detected by the temperature sensor 72.

(1-3-5. Cooling System)

The cooling system includes a water pump 80 and an unillustrated radiator, an unillustrated radiator fan, etc. The water pump 80 circulates the coolant water (coolant) in the FC 40 to thereby cool the FC stack 40. As a result of cooling the FC 40, the temperature of the coolant water rises, and heat of the coolant water is radiated in the radiator, which is blown through the radiator fan.

(1-3-6. Cell Voltage Monitor 42)

The cell voltage monitor 42 is a device for detecting the cell voltage Vcell of each of unit cells of the FC stack 40. The cell voltage monitor 42 includes a monitor body, and a wire harness connecting the monitor body with each of the unit cells. The monitor body scans all of the unit cells at predetermined intervals to detect the cell voltage Vcell of each cell, and calculates the average cell voltage and the lowest cell voltage. Then, the monitor body outputs the average cell voltage and the lowest cell voltage to the ECU 24.

(1-3-7. Power System)

As shown in FIG. 2, electric power from the FC 40 (hereinafter referred to as the "FC electric power Pfc") supplied to the air pump 60, the water pump 80, the air conditioner 90, a downverter 92 (voltage step down DC/DC converter), a low voltage battery 94, an accessory 96, and the ECU 24 in addition to the inverter 16 and the motor 14 (during power running), the DC/DC converter 22, and the high voltage battery 20 (during charging). As shown in FIG. 1, a back flow prevention diode 98 is disposed between the FC unit 18 (FC 40) and the inverter 16 and the DC/DC converter 22. Further, the power generation voltage of the FC 40 (hereinafter referred to as the "FC voltage Vfc") is detected by a voltage sensor 100 (FIG. 4), and the power generation current of the FC 40 (hereinafter referred to as the FC current Ifc") is detected by a current sensor 102. The FC voltage Vfc and the FC current Ifc are outputted to the ECU 24.

[1-4. High Voltage Battery 20]

The battery 20 is an energy storage device (energy storage) containing a plurality of battery cells. For example, a lithium-ion secondary battery, a nickel hydrogen secondary battery, or a capacitor can be used as the battery 20. In the present embodiment, the lithium-ion secondary battery is used. The output voltage [V] of the battery 20 (hereinafter referred to as the "battery voltage Vbat") is detected by a voltage sensor 104 (FIG. 2), and the output current [A] of the battery 20 (hereinafter referred to as the "battery current Ibat") is detected by the current sensor 106. The battery voltage Vbat and the battery current Ibat are outputted to the ECU 24. The ECU 24 calculates the remaining battery level (state of charge) (hereinafter referred to as the "SOC") [%] of the battery 20 based on the battery voltage Vbat and the battery current Ibat.

[1-5. DC/DC Converter 22]

The DC/DC converter 22 controls targets to which the FC electric power Pfc from the FC unit 18, the electric power [W] supplied from the battery 20 (hereinafter referred to as the "battery electric power Pbat"), and the regenerative electric power Preg from the motor 14 are supplied.

Figure 4:
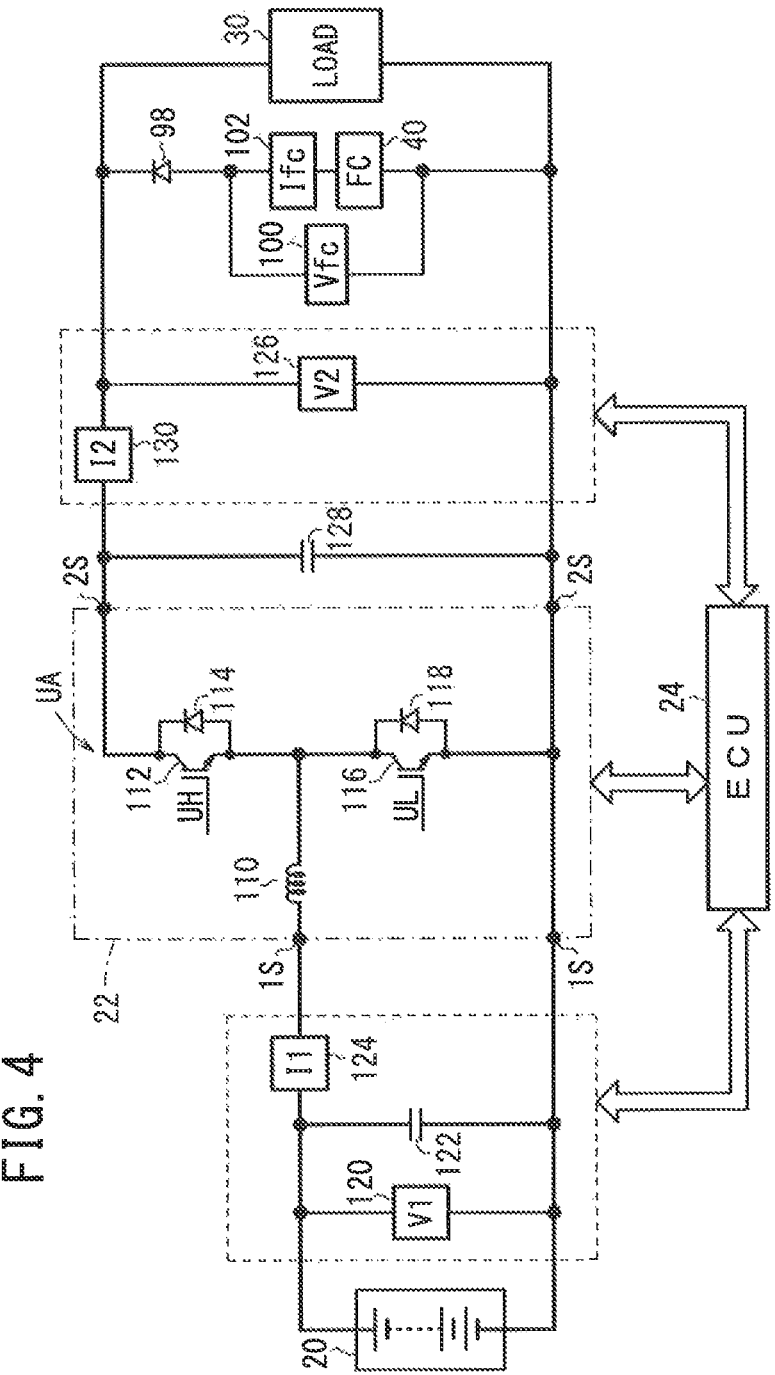
FIG. 4 is a diagram showing details of a DC/DC converter according to the embodiment.

FIG. 4 shows details of the DC/DC converter 22 in the present embodiment. As shown in FIG. 4, one side of the DC/DC converter 22 is connected to the primary side 1S where the battery 20 is provided, and the other side of the DC/DC converter 22 is connected to the secondary side 2S, which is connection points between the load 30 and the FC 40.

The DC/DC converter 22 is a chopper type step up/down voltage converter for increasing the voltage on the primary side 1S (primary voltage V1) [V] to the voltage on the secondary side 2S (secondary voltage V2) [V] (V1≤V2), and decreasing the secondary voltage V2 to the primary voltage V1.

As shown in FIG. 4, the DC/DC converter 22 includes a phase arm UA interposed between the primary side 1S and the secondary side 2S, and a reactor 110.

The phase arm UA includes an upper arm element (an upper arm switching element 112 and an antiparallel diode 114) and a lower arm element (a lower arm switching element 116 and an antiparallel diode 118). For example, MOSFET, IGBT, or the like is adopted in each of the upper arm switching element 112 and the lower arm switching element 116.

The reactor 110 is interposed between the middle point (common connection point) of the phase arm UA and the positive electrode of the battery 20. The reactor 110 is operated to accumulate and release energy during voltage conversion between the primary voltage V1 and the secondary voltage V2 by the DC/DC converter 22.

The upper arm switching element 112 is turned on when high level of a gate drive signal (drive voltage) UH is outputted from the ECU 24, and the lower arm switching element 116 is turned on when high level of a gate drive signal (drive voltage) UL is outputted from the ECU 24.

The ECU 24 detects primary voltage V1 by a voltage sensor 120 provided in parallel with a smoothing capacitor 122 on the primary side, and detects electrical current on the primary side (primary current I1) [A] by a current sensor 124. Further, the ECU 24 detects secondary voltage V2 by a voltage sensor 126 provided in parallel with the smoothing capacitor 128 on the secondary side, and detects electrical current on the secondary side (secondary current I2) [A] by a current sensor 130.

[1-6. ECU 24]

The ECU 24 controls the motor 14, the inverter 16, the FC unit 18, the battery 20, and the DC/DC converter 22 through a communication line 140 (see e.g., FIG. 1). For implementing the control, programs stored in a memory (ROM) are executed, and detection values obtained by various sensors such as the cell voltage monitor 42, the flow rate sensors 68, 70, the temperature sensor 72, the voltage sensors 100, 104, 120, 126, and the current sensors 102, 106, 124, 130 are used.

In addition to the above sensors, the various sensors herein include a first opening degree sensor 150, a second opening degree sensor 151, a motor rotation number sensor 152, and a gradient sensor 153 (FIG. 1). The first opening degree sensor 150 detects the opening degree θp [degrees] of an accelerator pedal 154. The second opening degree sensor 151 detects the opening degree θb [degrees] of a brake pedal 155. The rotation number sensor 152 detects the rotation number [rpm] of the motor 14 (hereinafter referred to as the "motor rotation number Nm" or the "rotation number Nm"). The ECU 24 detects the vehicle velocity V [km/h] of the FC vehicle 10 based on the rotation number Nm. The gradient sensor 153 detects a gradient A [°] of the vehicle 10. Further, a main switch 158 (hereinafter referred to as the "main SW 158") is connected to the ECU 24. The main SW 158 switches between supply and non-supply of the electric power from the FC unit 18 and the battery 20 to the motor 14. This main SW 158 can be operated by a user.

The ECU 24 includes a microcomputer. Further, as necessary, the ECU 24 has a timer and input/output (I/O) interfaces such as an A/D converter and a D/A converter. The ECU 24 may comprise only a single ECU. Alternatively, the ECU 24 may comprise a plurality of ECUs for each of the motor 14, the FC unit 18, the battery 20, and the DC/DC converter 22.

After the load required by the FC system 12, i.e., required by the FC vehicle 10 as a whole is determined based on the state of the FC stack 40, the state of the battery 20, and the state of the motor 14, and also based on inputs (load requests) from various switches and various sensors, the ECU 24 determines allocation (shares) of loads through adjustment, and more specifically determines a good balance among a load which should be assigned to the FC stack 40, a load which should be assigned to the battery 20, and a load which should be assigned to the regenerative power supply (motor 14), and sends instructions to the motor 14, the inverter 16, the FC unit 18, the battery 20, and the DC/DC converter 22.

2. Control According to Present Embodiment

Next, control in the ECU 24 will be described.

[2-1. Basic Control]

Figure 5:
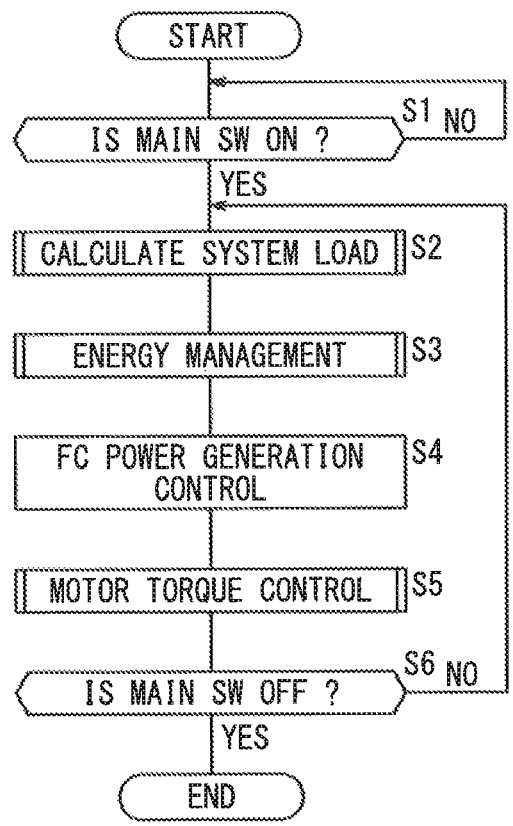
FIG. 5 is a flow chart showing basic control in an electronic control unit (ECU)

FIG. 5 is a flow chart showing basic control in the ECU 24. In step S1, the ECU 24 determines whether or not the main SW 158 is in an ON state. If the main SW 158 is not in the ON state (S1: NO), step S1 is repeated. If the main SW 158 is in the ON state (S1: YES), the control proceeds to step S2. In step S2, the ECU 24 calculates the load (system load Psys) [W] required by the FC system 12.

In step S3, the ECU 24 performs energy management of the FC system 12. The energy management is a process mainly for calculating a power generation amount (FC electric power Pfc) of the FC 40 and an output of the battery 20 (battery electric power Pbat), and is intended to suppress degradation of the FC stack 40, and improve the efficiency in the output of the entire FC system 12.

In step S4, the ECU 24 implements control for peripheral devices of the FC stack 40, i.e., the air pump 60, the back pressure valve 64, the circulation valve 66, and the water pump 80 (FC power generation control). In step S5, the ECU 24 implements torque control of the motor 14.

In step S6, the ECU 24 determines whether or not the main SW 158 is in an OFF state. If the main SW 158 is not in the OFF state (S6: NO), the control returns to step S2. If the main SW 158 is in the ON state (S6: YES), the current process is finished.

[2-2. Calculation of System Load Fsys]

Figure 6:
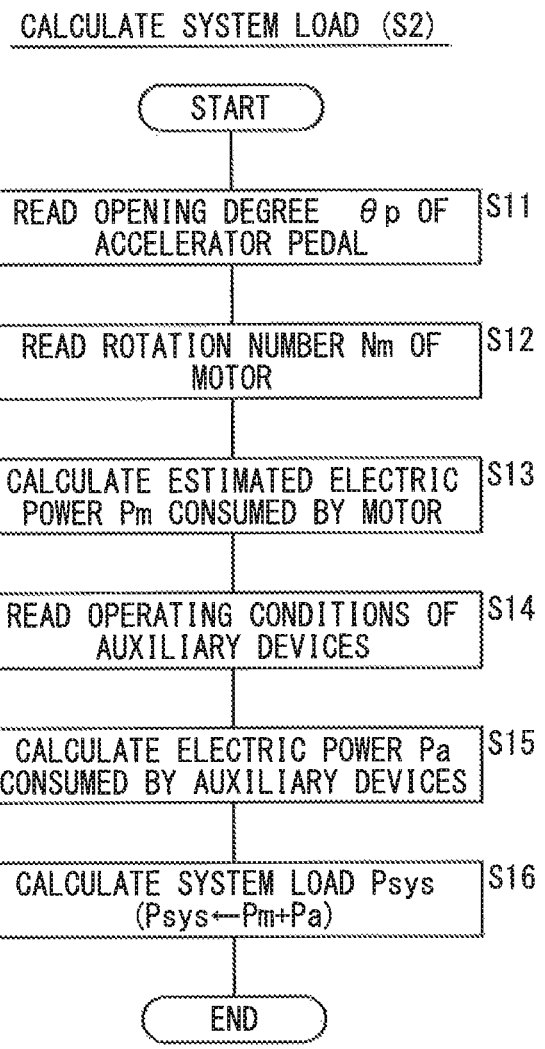
FIG. 6 is a flow chart of calculating a system load.

FIG. 6 is a flow chart for calculating the system load Psys. In step S11, the ECU 24 reads the opening degree θp of the accelerator pedal 156 from the opening degree sensor 150. In step S12, the ECU 24 reads the rotation number Nm of the motor 14 from the rotation number sensor 152.

Figure 7:
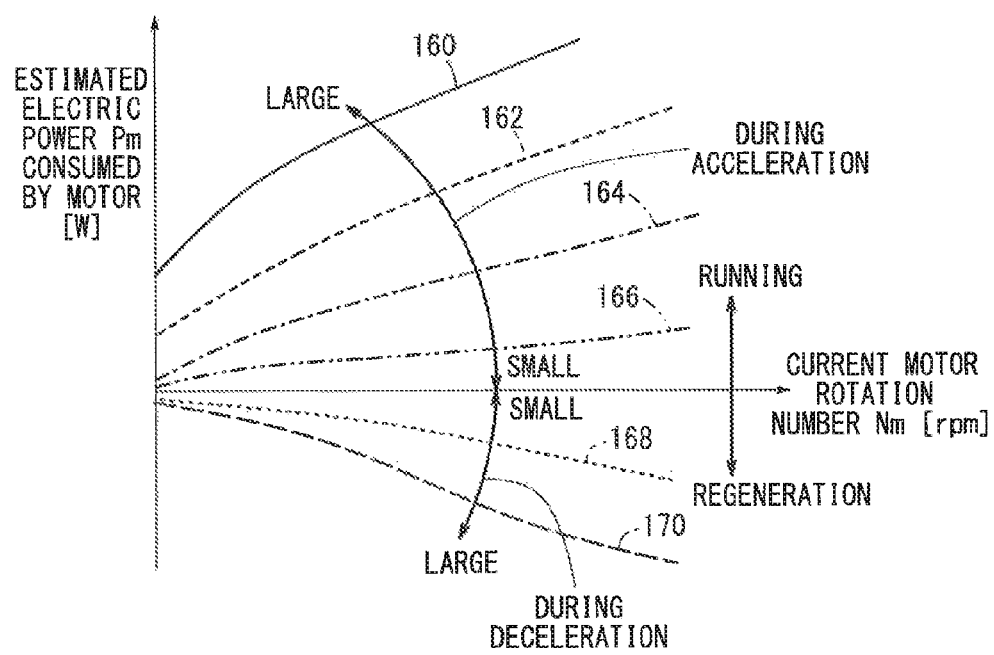
FIG. 7 is a graph showing the relationship between the current rotation number of a motor and the estimated electric power consumed by the motor.

In step S13, the ECU 24 calculates the estimated electric power Pm [W] consumed by the motor 14 based on the opening degree θp and the rotation number Nm. Specifically, in a map shown in FIG. 7, the relationship between the rotation number Nm and the estimated consumed energy Pm is stored for each opening degree θp. For example, in the case where the opening degree θp is Bpi, a characteristic 160 is used. Likewise, in the cases where the opening degrees θp are θp2, θp3, θp4, θp5, and θp6, characteristics 162, 164, 166, 168, and 170 are used, respectively. After the characteristic indicating the relationship between the rotation number Nm and the consumed electric power Pm is determined based on the opening degree θp, based on the determined characteristic, the estimated consumed energy Pm in correspondence with the rotation number Nm is determined.

In step S14, the ECU 24 reads data of the current operating conditions from auxiliary devices. For example, the auxiliary devices herein include auxiliary devices operated at high voltage, such as the air pump 60, the water pump 80, and the air conditioner 90, and auxiliary devices operated at low voltage, such as the low voltage battery 94, the accessory 96, and the ECU 24. For example, as for the operating condition of the air pump 60, the rotation number Nap [rpm] is read. As for the operating condition of the water pump 80, the rotation number Nwp [rpm] is read. As for the operating condition of the air conditioner 90, output settings of the air conditioner 90 are read.

In step S15, the ECU 24 calculates the electric power Pa [W] consumed by the auxiliary devices depending on the present operating conditions of the auxiliary devices. In step S16, the ECU 24 calculates the sum of the estimated electric power Pm consumed by the motor 14 and the electric power Pa consumed by the auxiliary devices, as the estimated consumed electric power in the entire FC vehicle 10 (i.e., system load Psys).

[2-3. Energy Management]

As described above, the energy management in the present embodiment is aimed to improve the efficiency in the output of the entire FC system 12, while suppressing degradation of the FC stack 40.

(2-3-1. Premise)

Figure 8:
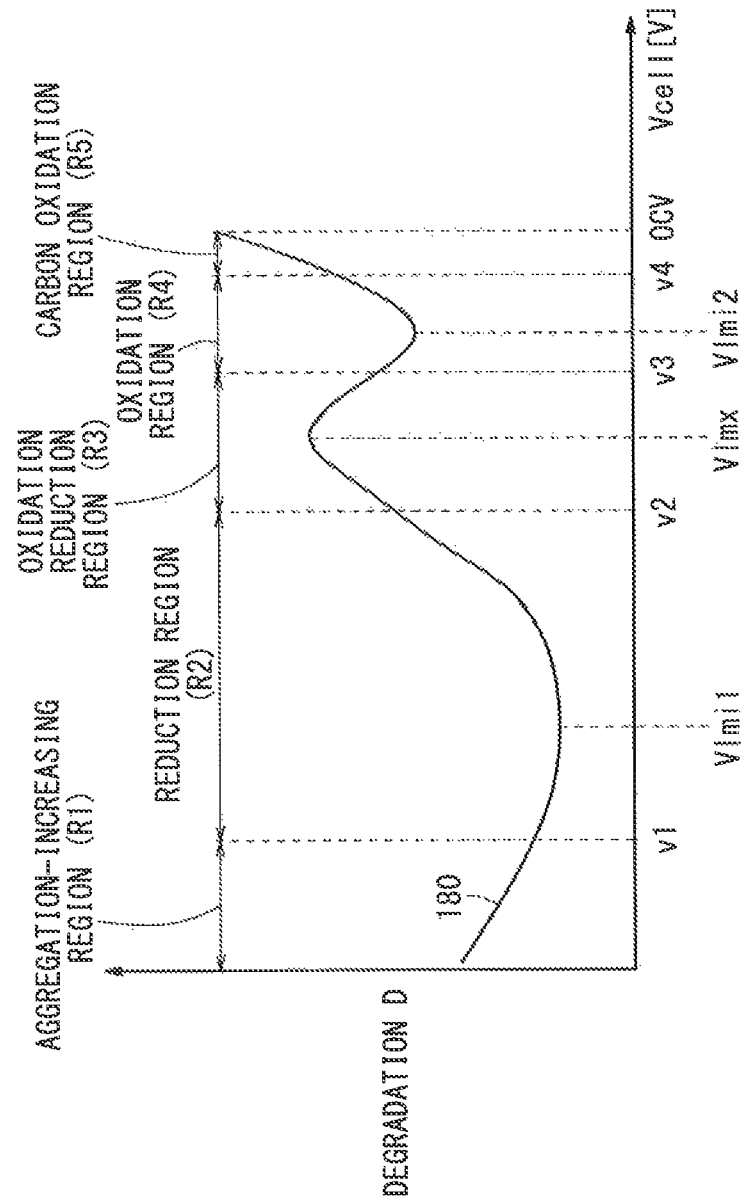
FIG. 8 is a graph showing an example of the relationship between the electric potential of a fuel cell of a fuel cell stack and degradation of the fuel cell.

FIG. 8 shows an example of the relationship between the voltage of the FC cell of the FC stack 40 (cell voltage Vcell) [V] and the degradation D of the cell. That is, a curve 180 in FIG. 8 shows the relationship between the cell voltage Vcell and the degradation D.

In FIG. 8, in a region below the electric potential v1 (e.g., 0.5 V), reduction reaction of platinum (oxidized platinum) in the FC cell proceeds heavily, and aggregation of platinum occurs excessively (hereinafter referred to as the "platinum-aggregation increasing region R1" or the "aggregation increasing region R1"). In a region from the electric potential v1 to the electric potential v2 (e.g., 0.8 V), reduction reaction proceeds stably (hereinafter referred to as the "platinum reduction region R2" or the "reduction region R2").

In a region from the electric potential v2 to the electric potential v3 (e.g. 0.9 V), oxidation-reduction reaction of platinum proceeds (hereinafter referred to as the "platinum oxidation reduction progress region R3" or the "oxidation reduction region R3"). In a region from the electric potential v3 to the electric potential v4 (e.g., 0.95V), oxidation reaction of platinum proceeds stably (hereinafter referred to as the stable platinum oxidation region R4" or the "oxidation region R4"). In a region from the electric potential v4 to OCV (open circuit voltage), oxidation of carbon in the cell proceeds (hereinafter referred to as the "carbon oxidation region R5").

As described above, in FIG. 8, if the cell voltage Vcell is in the platinum reduction region R2 or the stable platinum oxidation region R4, degradation of the FC cell occurs to a smaller extent in comparison with the adjacent regions. In contrast, if the cell voltage Vcell is in the platinum-aggregation increasing region R1, the platinum oxidation reduction progress region R3, or the carbon oxidation region R5, degradation of the FC cell occurs to a greater extent in comparison with the adjacent regions.

In FIG. 8, on the face of it, a curve 180 is uniquely determined. However, in practice, the curve 180 varies depending on variation of the cell voltage Vcell (varying speed Acell) [V/sec] per unit time.

Figure 9:
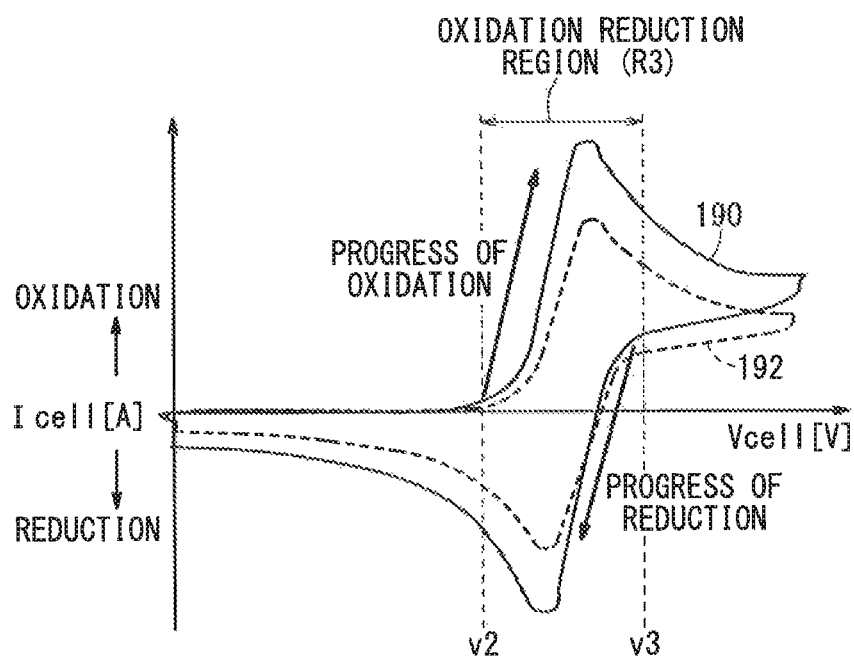
FIG. 9 is a cyclic voltammetry diagram showing an example of the progress of oxidation and the progress of reduction in the cases of different varying speeds in the electric potential of the fuel cell.

FIG. 9 is a cyclic voltammetry diagram showing an example of the progress of oxidation and the progress of reduction in the cases of different varying speeds Acell. In FIG. 9, a curve 190 shows a case where the varying speed Acell is high, and a curve 192 shows a case where the varying speed Acell is low. As can be seen from FIG. 9, since the degree of the progress in oxidation and reduction varies depending on the varying speed Acell, the electric potentials v1 to v4 cannot necessarily be determined uniquely. Further, the electric potentials v1 to v4 may change depending on the individual difference in the FC cell. Therefore, preferably, the electric potentials v1 to v4 should be set at the theoretical values, simulation values, or the measured values with the errors being taken into account.

Figure 10:
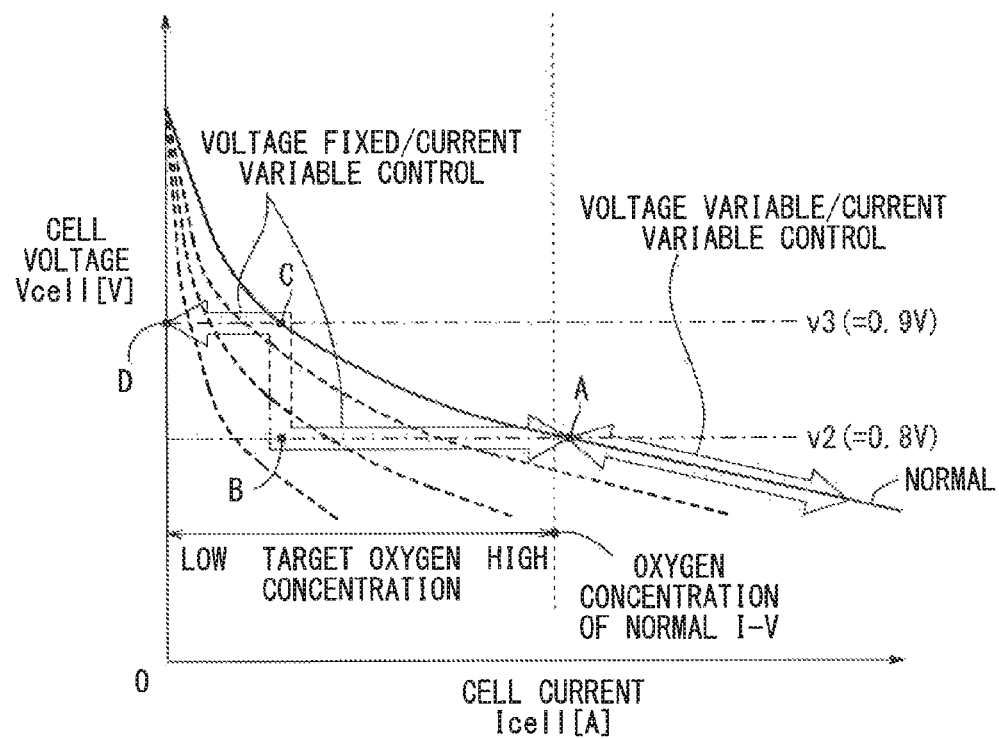
FIG. 10 is a graph showing power generation control of a fuel cell stack according to the embodiment.

Further, in the current-voltage (IV) characteristic of the FC cell, as in the case of normal fuel cells, as the cell voltage Vcell decreases, the cell current Icell [A] is increased (see FIG. 10). Additionally, the power generation voltage (FC voltage Vfc) of the FC stack 40 is obtained by multiplying the cell voltage Vcell by the serial connection number Nfc in the FC stack 40. The serial connection number Nfc indicates the number of FC cells connected in series in the FC stack 40. The serial connection number Nfc is also simply referred to as the "cell number".

In view of the above, in the present embodiment, during voltage conversion operation of the DC/DC converter 22, the target voltage (target FC voltage Vfctgt) of the FC stack 40 is mainly set within the platinum reduction region R2, and as necessary, set within the stable platinum oxidation region R4 (Specific examples will be described with reference to, e.g., FIG. 10.). By switching the target FC voltage Vfctgt in this manner, the time where the FC voltage Vfc is in the regions R1, R3, and R5 (in particular, platinum oxidation reduction progress region R3) can be reduced as much as possible, whereby degradation of the FC stack 40 can be prevented.

In the above process, the electric power supplied by the FC stack 40 (FC electric power Pfc) may not be equal to the system load Psys. In this regard, if the FC electric power Pfc is less than the system load Psys, electric power for the shortage is supplied from the battery 20. Further, if the FC electric power Pfc exceeds the system load Psys, the battery 20 is charged with the excessive electric power of the FC electric power Pfc.

In FIG. 8, the electric potentials v1 to v4 are specified as specific numeric values for implementing control as described later. The numeric values are merely determined for convenience in the control. Stated otherwise, as can be seen from the curve 180, since degradation D changes continuously, the electric potentials v1 to v4 can be determined suitably depending on the specification of control.

The platinum reduction region R2 includes a minimal value of the curve 180 (first minimal value Vlmi1). The platinum oxidation reduction progress region R3 includes a maximal value of the curve 180 (maximal value Vlmx). The stable platinum oxidation region R4 includes another minimal value (second minimal value Vlmi2) of the curve 180.

(2-3-2. Power Generation Control of FC 40 Used in Energy Management)

FIG. 10 is a graph showing power generation control of the FC 40 according to the embodiment of the present invention. In the embodiment of the present invention, as power generation control used in energy management (method of controlling supply of electric power), mainly, two types of power generation controls are used. That is, in the embodiment of the present invention, as the power generation control, voltage variable/current variable control (voltage variable/output variable control) and voltage fixed/current variable control (voltage fixed/output variable control) are switchably used. In the voltage variable/current variable control, both of the target FC voltage Vfctgt and the FC current Ifc (FC electric power Pfc) are variable. In the voltage fixed/current variable control, the target FC voltage Vfctgt is fixed, and the FC current Ifc (FC electric power Pfc) is variable.

The voltage variable/current variable control is mainly used when the system load Psys is relatively high. In the state where the target oxygen-concentration Cotgt is fixed (or oxygen is kept in a rich state), the target FC voltage Vfctgt is adjusted to control the FC current Ifc. In this manner, basically, the system load Psys can be covered with the FC electric power Pfc.

The voltage fixed/current variable control is mainly used when the system load Psys is relatively low or during regeneration. The target cell voltage Vcelltgt (=target FC voltage Vfctgt/cell number) is fixed to a reference electric potential (in the present embodiment, the electric potential v2 (=0.8 V) or the electric potential v3 (=0.9 V)) which is outside the oxidation reduction region R3, and the target oxygen concentration Cotgt is variable, whereby FC electric current Ifc is made variable (although there is a partial exception). In this manner, basically, it becomes possible to cover the system load Psys with the FC electric power Pfc (as described later in detail). The shortage of the FC electric power Pfc is supplemented with assistance of the battery 20.

(2-3-3. Overall Flow of Energy Management)

Figure 11:
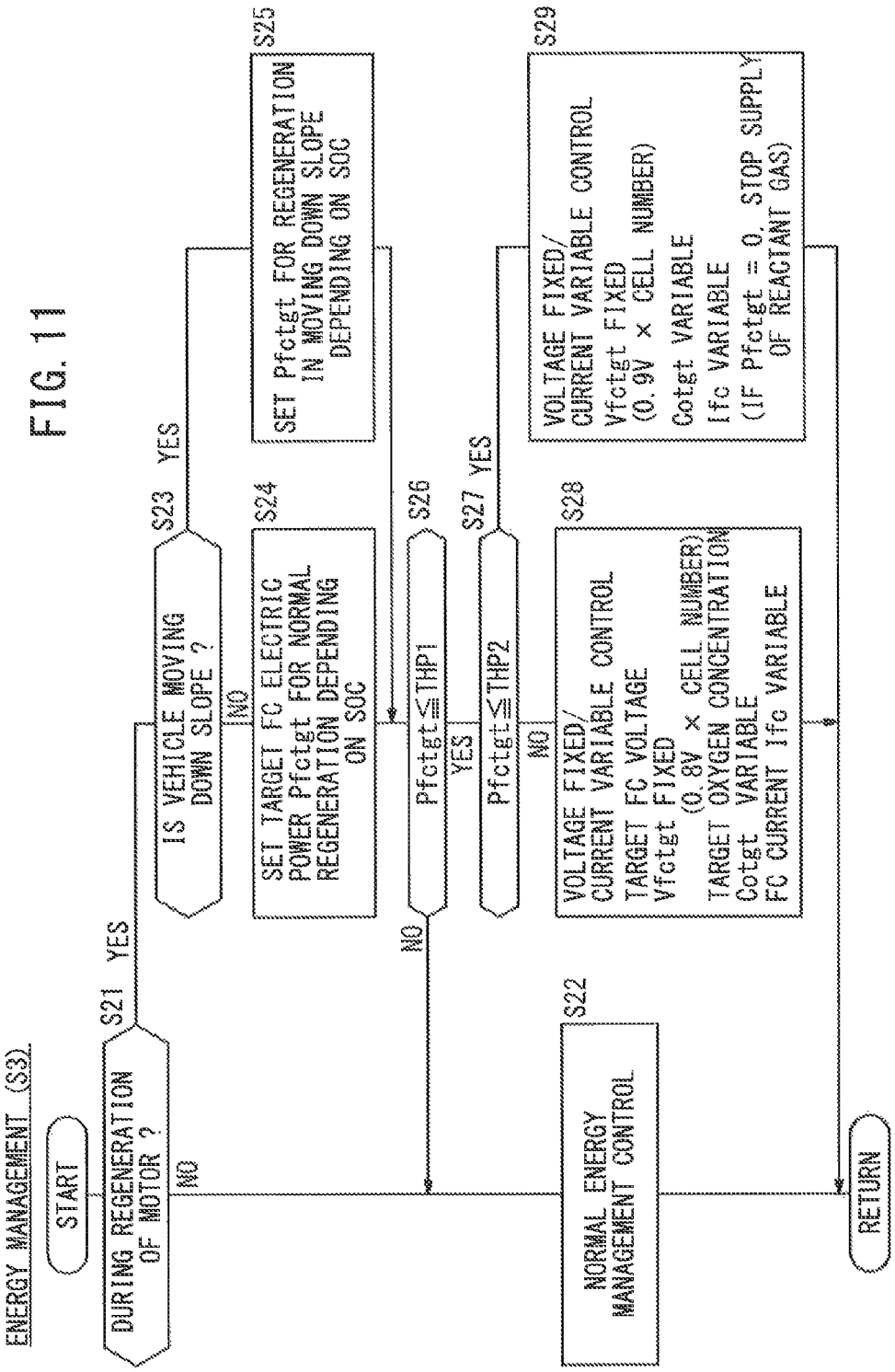
FIG. 11 is a flow chart where the ECU performs energy management of the fuel cell vehicle.

FIG. 11 is a flow chart where the ECU 24 performs energy management of the FC system 12 (S3 in FIG. 5). In step S21, the ECU 24 determines whether or not the motor 14 (or the vehicle 10) is regenerating electric power. For example, the determination is made by determining the direction of the electric current (whether the electric current is flowing toward the motor 14 or flowing from the motor 14) by a current sensor (e.g., the current sensor 124 or the current sensor 130). Alternatively, the determination may be made based on the change amount of the motor rotation number Nm per unit time (i.e., increase or decrease in the motor rotation number Nm). Alternatively, it is possible to determine whether or not the motor 14 is regenerating electric power based on the operational amount of a foot brake (not shown).

If the motor 14 is not regenerating electric power (N21: NO), in step S22, the ECU 24 implements normal energy management control. In the normal energy management control, the voltage variable/current variable control or the voltage fixed/current variable control is used in accordance with the system load Psys.

If the motor 14 is regenerating electric power (S21: YES), in step S23, the ECU 24 determines whether or not the vehicle 10 is moving down a slope. The term "moving down a slope" means that the vehicle 10 is traveling on a downslope. The determination as to whether or not the vehicle 10 is moving down a slope may be made based on a gradient A of the vehicle 10 detected by the gradient sensor 153. Alternatively, the determination as to whether or not the vehicle 10 is moving down a slope may be made using the relationship between the opening degree θp of the accelerator pedal 156 and the vehicle velocity V based on the fact that while the vehicle 10 is moving down a slope, even if the opening degree θp of the accelerator pedal 156 is small, the vehicle velocity V becomes high. Alternatively, the determination as to whether or not the vehicle 10 is moving down a slope may be made using the relationship between the opening degree θb of the brake pedal 155 and the vehicle velocity V based on the fact that while the vehicle 10 moving down a slope, even if the brake pedal 155 is depressed, deceleration of the vehicle 10 becomes small. Alternatively, the determination as to whether or not the vehicle 10 is moving down a slope may be made based on the condition of braking operation by the motor 14 (braking as which the motor 14 functions, like so called engine braking).

If the vehicle 10 is not moving down a slope (S23: NO), the vehicle 10 is regenerating electric power in a state where the vehicle 10 is not moving down a slope (e.g., in the state where the vehicle is being decelerated by the depressed brake pedal 155 or by automatic braking by the ECU 24 during traveling on a flat road) (hereinafter regeneration of electric power in this state is referred to as "normal regeneration"). In this case, in step S24, the ECU 24 sets target FC electric power Pfctgt for normal regeneration depending on the SOC of the battery 20.

Figure 12:
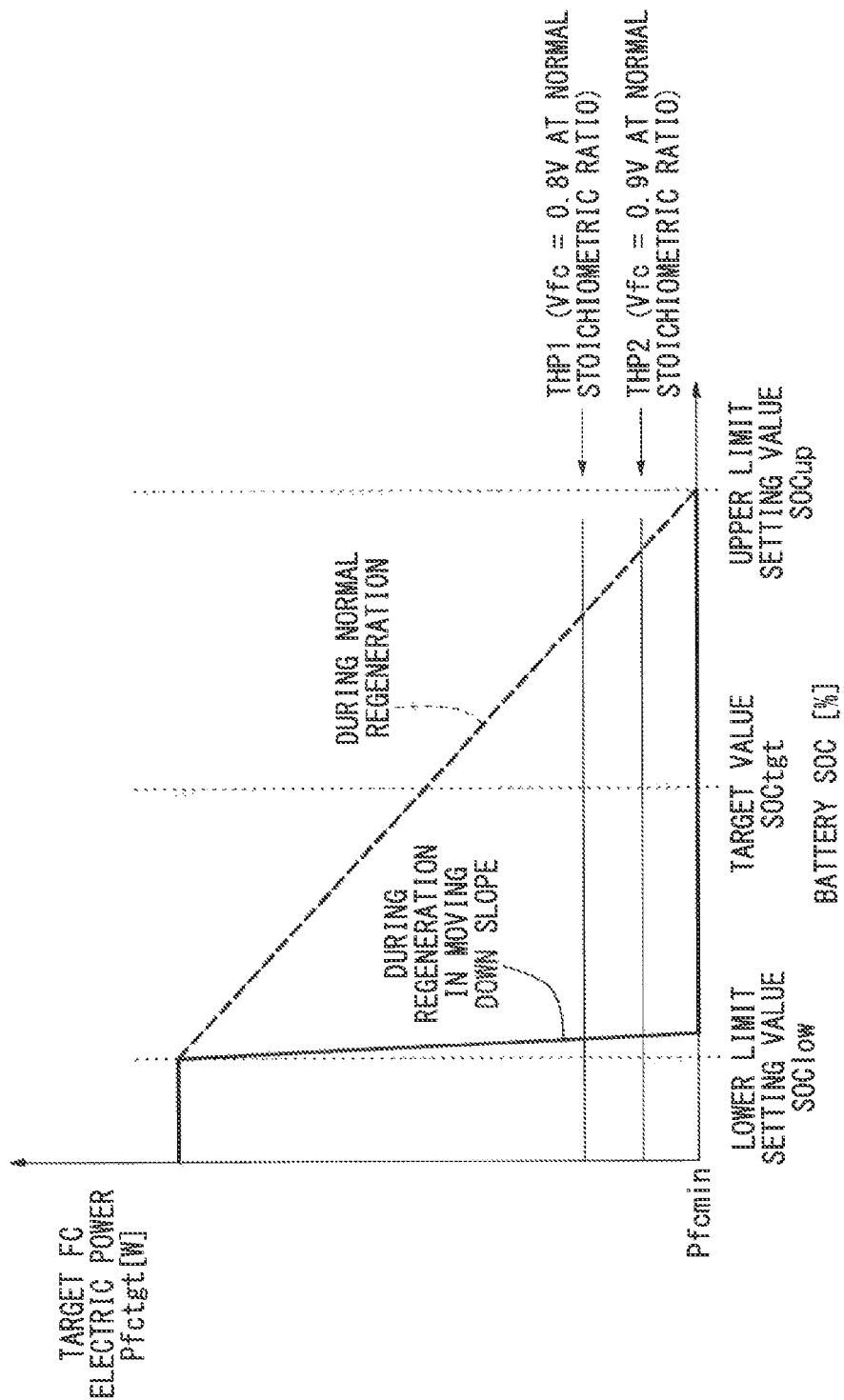
FIG. 12 is a graph showing a relationship between SOC of a battery and target FC electric power during regeneration.

FIG. 12 is a graph showing the relationship between the SOC of the battery 20 and the target FC electric power Pfctgt during regeneration. As shown in FIG. 12, during normal regeneration, as the SOC increases, the target FC electric power Pfctgt is decreased between the lower limit setting value SOClow and the upper limit setting value SOCup.

In step S23, if the vehicle 10 is moving down a slope (S23: YES), the motor 14 is generating electric power in a state where the vehicle 10 is moving down a slope. In this case, in step S25, the ECU 24 sets a target FC electric power Pfctgt for regeneration of electric power in moving down a slope depending on the SOC of the battery 20. Specifically, as shown FIG. 12, during regeneration of electric power in moving down a slope, if the SOC is around the lower limit setting value SOClow, the target FC electric power Pfctgt is sharply decreased, and if the SOC is above the lower limit setting value SOClow, the target FC electric power Pfctgt is set to the minimum value Pfcmin (e.g., zero).

In step S26, the ECU 24 determines whether or not the target FC electric power Pfctgt set in step S24 or step S25 is a threshold value THP1 or less. The threshold value THP1 is used for determining whether or not the regenerative electric power Preg of the motor 14 has a relatively low value (whether or not the target FC electric power Pfctgt has a relatively high value). For example, the threshold value THP1 corresponds to the FC electric power Pfc when the FC voltage Vfc is the electric potential v2 (=0.8 V)×cell number in the case where the oxygen concentration Co is normal (see the point A in FIG. 10).

If the target FC electric power Pfctgt is not the threshold value THP1 or less (S26: NO), the target FC electric power Pfctgt corresponds to relatively low regenerative electric power Preg. In this case, the control proceeds to the above step S22. If the target FC electric power Pfctgt is the threshold value THP1 or less (S26: YES), the target FC electric power Pfctgt corresponds to regenerative electric power which is not relatively low. In this case, the control proceeds to step S27.

In step S27, the ECU 24 determines whether or not the target FC electric power Pfctgt set in step S24 or step S25 is a threshold value THP2 or less. The threshold value THP2 is used for determining whether or not the target FC electric power Pfctgt corresponding to the regenerative electric power Preg of the motor 14 has a relatively medium value. For example, the threshold value THP2 corresponds to the FC electric power Pfc when the FC voltage Vfc is the electric potential v3 (=0.9 V)×cell number in the case where the oxygen concentration Co is normal (see the point C in FIG. 10).

If the target FC electric power Pfctgt is not the threshold value THP2 or less (S27: NO), the target FC electric power Pfctgt is larger than the threshold value THP2 and equal to or smaller than the threshold value THP1 (THP2<Pfctgt≤THP1), and corresponds to relatively medium regenerative electric power Preg. In this case, the control proceeds to step S28.

In step S28, the ECU 24 fixes the target FC voltage Vfctgt to 0.8 V×cell number and implement voltage fixed/current variable control. Specifically, in FIG. 10, oxygen concentration Co is controlled such that the cell current Icell changes between the point A and the point B.

If the target FC electric power Pfctgt is the threshold value THP2 or less (S27: YES), the target FC electric power Pfctgt corresponds to relatively high regenerative electric power Preg. In this case, in step S29, the ECU 24 fixes the target FC voltage Vfctgt to 0.9 V×cell number and implement voltage fixed/current variable control. Specifically, in FIG. 10, the oxygen concentration Co is controlled such that the cell current Icell changes between the point C and the point D. It should be noted that in the case where the target FC electric power Pfctgt is zero, operation of the air pump 60 is stopped, and active power generation of the FC 40 (except power generation consuming the residual gas) is stopped.

It should be noted that, in the general characteristics of the fuel cells, if the output voltage changes sharply, degradation of the fuel cell proceeds. In particular, if the output of the fuel cell is low (output voltage is high), this tendency becomes noticeable. In this regard, in the flow chart of FIG. 11, in order to avoid sharp changes in the FC voltage Vfc at the time of starting regeneration of electric power by the motor 14, it is preferable to perform the process of limiting the change amount of the target FC voltage Vfctgt per unit time (or in each computation cycle) (hereinafter referred to as the "rate limit process"). Since the target FC voltage Vfctgt correlates with the target FC current Ifctgt and the target FC electric power Pfctgt, the rate limit process may be applied to the target FC current Ifctgt and the target FC electric power Pfctgt.

(2-3-4. Voltage Variable/Current Variable Control)

As described above, the voltage variable/current variable control is mainly used when the system load Psys is relatively high. In the state where the target oxygen concentration Cotgt is fixed (or oxygen is kept in a rich state), the target FC voltage Vfctgt is adjusted to control the FC current Ifc.

That is, as shown in FIG. 10, in the voltage variable/current variable control, a normal current-voltage characteristic of a FC 40 (I-V characteristic indicated by a solid line in FIG. 10) is used. As in the case of the normal fuel cell, in the I-V characteristic of the FC 40, as the cell voltage Vcell (FC voltage Vfc) decreases, the cell current Icell (FC current Ifc) is increased. Thus, in the voltage variable/current variable control, the target FC current Ifctgt is calculated depending on the system load Psys, and the target FC voltage Vfctgt is calculated in correspondence with the target FC current Ifctgt. The ECU 24 controls the DC/DC converter 22 such that the FC voltage Vfc is adjusted to the target FC voltage Vfctgt. That is, the primary voltage V1 is elevated by the DC/DC converter 22 such that the secondary voltage V2 is adjusted to the target FC voltage Vfctgt, whereby the FC voltage Vfc is controlled and the FC current Ifc is controlled.

Figure 13:
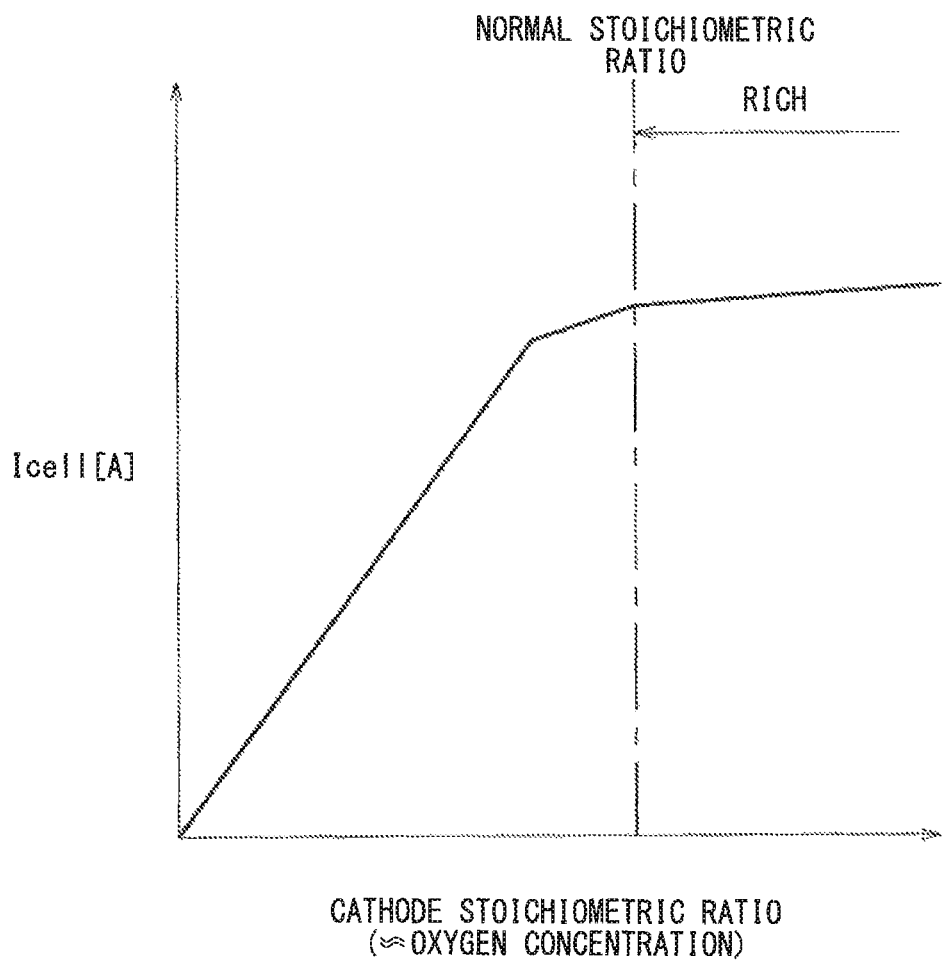
FIG. 13 is a graph showing the relationship between the cathode stoichiometric ratio and the cell current.

The expression "oxygen is in a rich state" means that oxygen is in a state where, for example, as shown in FIG. 13, the cell current Icell is kept at a constant level even if the cathode stoichiometric ratio is increased. In this state, oxygen is present at the normal stoichiometric ratio or more where oxygen is substantially saturated. The meaning of the expression "hydrogen is in a rich state" can be understood in the same manner. The cathode stoichiometric ratio herein means the flow rate of the air supplied to the cathode channel 74/the flow rate of the air consumed by power generation in the FC 40, and it is closely related to oxygen concentration Co in the cathode channel 74. The cathode stoichiometric ratio is adjusted, e.g., by controlling oxygen concentration. Co.

In the voltage variable/current variable control as described above, even if the system load Psys is high, basically, the entire system load Psys can be covered with the FC electric power Pfc.

(2-3-5. Voltage Fixed/Current Variable Control)

As described above, the voltage fixed/current variable control is mainly used when the system load Psys is low or during regeneration. The target cell voltage Vcelltgt (=target FC voltage Vfctgt/cell number) is fixed to a reference electric potential (in the present embodiment, the electric potential v2 (=0.8 V) or the electric potential v3 (=0.9 V)) which is outside the oxidation reduction region R3, and the target oxygen concentration Cotgt is variable. Thus, the FC current is variable.

That is, as shown in FIG. 10, in the voltage fixed/current variable control, while the cell voltage Vcell is kept at a constant level, the oxygen concentration. Co is decreased by decreasing the target oxygen concentration Cotgt. As shown in FIG. 13, when the cathode stoichiometric ratio (oxygen concentration Co) is decreased, the cell current Icell (FC current Ifc) is accordingly decreased. Therefore, in the state where the cell voltage Vcell is kept at a constant level, by increasing or decreasing the target oxygen concentration Cotgt, it becomes possible to control the cell current Icell (FC current Ifc) and the FC electric power Pfc. The shortage of the FC electric power Pfc is supplemented with assistance of the battery 20.

Figure 14:
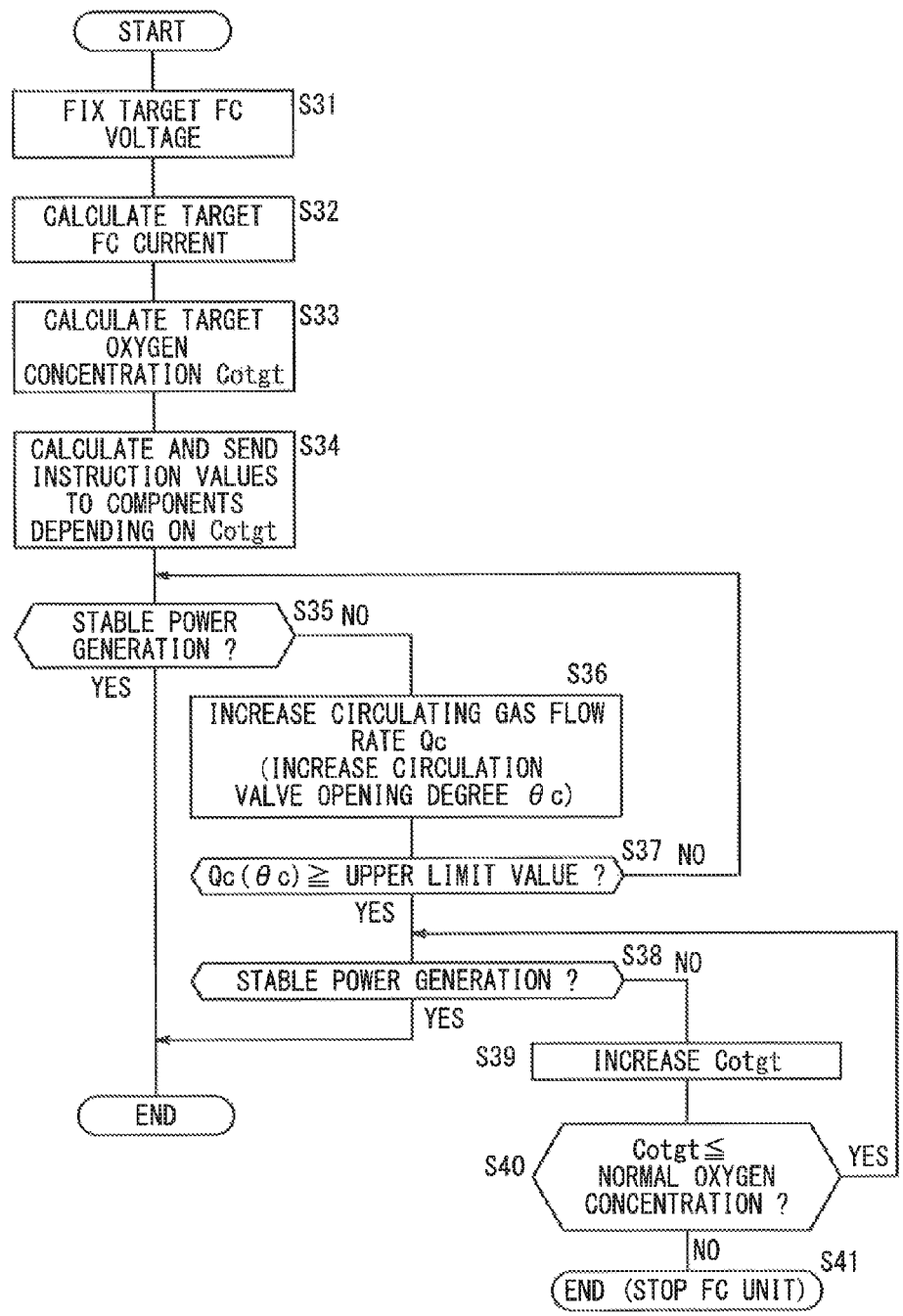
FIG. 14 is a flowchart of voltage fixed/current variable control.

FIG. 14 is a flow chart showing the voltage fixed/current variable control (S28, S29 in FIG. 11). In step S31, the ECU 24 fixes the target FC voltage Vfctgt to a reference electric potential (in the present embodiment, the electric potential v2 (=0.8 V)×cell number or the electric potential v3 (=0.9 V)×cell number) by adjusting the voltage elevating rate of the DC/DC converter 22, the reference electric potential being set to be an electric potential outside the oxidation reduction region R3. In step S32, the ECU 24 calculates the target FC current Ifctgt in correspondence with the system load Psys.

Figure 15:
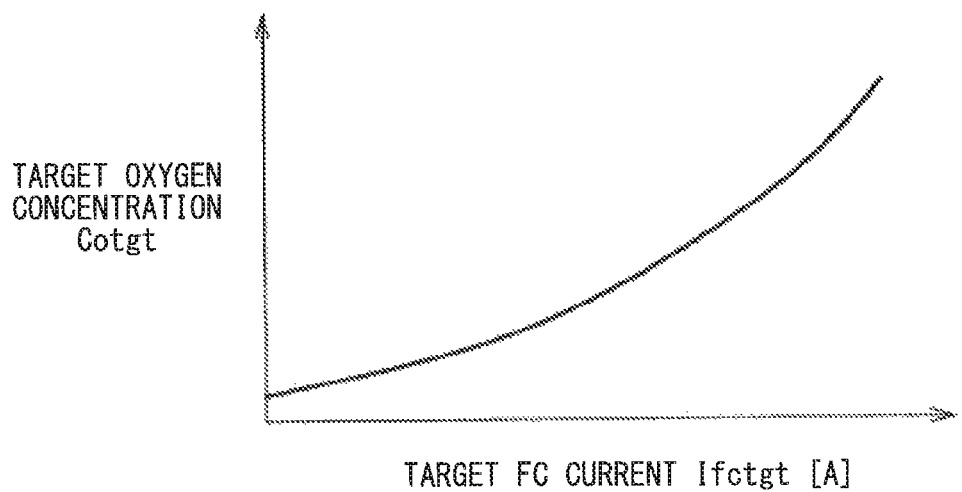
FIG. 15 is a graph showing the relationship between the target FC current and the target oxygen concentration in the voltage fixed/current variable control.

In step S33, the ECU 24 calculates the target oxygen concentration Cotgt in correspondence with the target FC current Ifctgt on the premise that the target FC voltage Vfctgt is at the reference electric potential (see FIGS. 10 and 15). FIG. 15 shows the relationship between the target FC current Ifctgt and the target oxygen concentration Cotgt when the FC voltage Vfc is at the reference electric potential.

In step S34, depending on the target oxygen concentration Cotgt, the ECU 24 calculates and sends instruction values to the respective components. The instruction values herein include the rotation number of the air pump 60 (hereinafter referred to as the "air pump rotation number Nap" or the "rotation number Nap"), the rotation number of the water pump 80 (hereinafter referred to as the "water pump rotation number Nwp" or the "rotation number Nwp"), the opening degree of the back pressure valve 64 (hereinafter referred to as the "back pressure valve opening degree θbp" or the "opening degree θbp") and the opening degree of the circulation valve 66 (hereinafter referred to as the "circulation valve opening degree θc" or the "opening degree θc".

Figure 16:
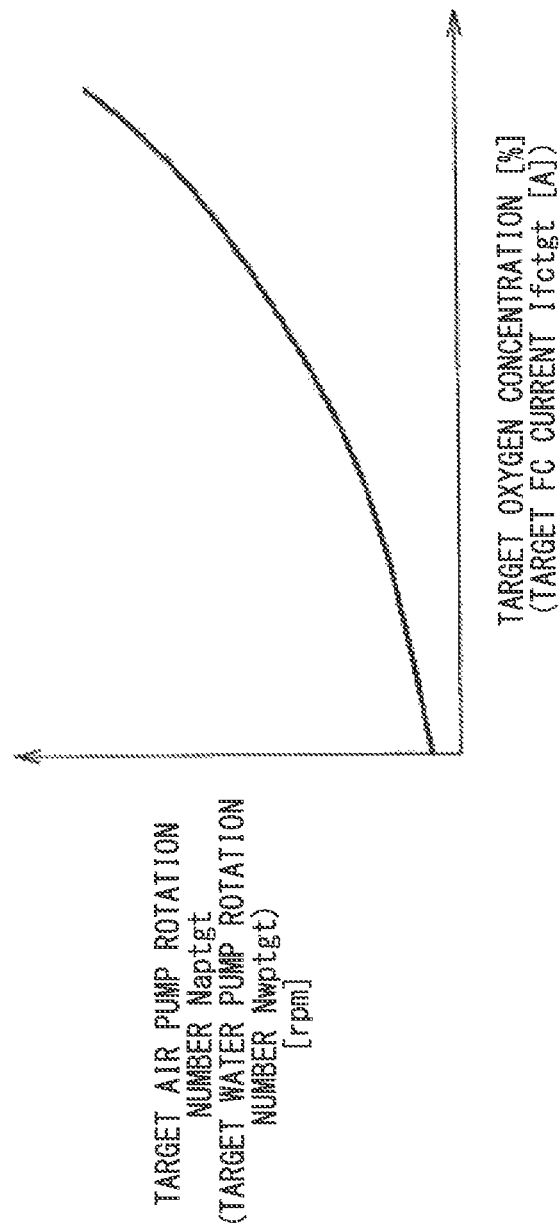
FIG. 16 is a graph showing the relationship between the target oxygen concentration and target FC current, and the target air pump rotation number and the target water pump rotation number in the voltage fixed/current variable control.
Figure 17:
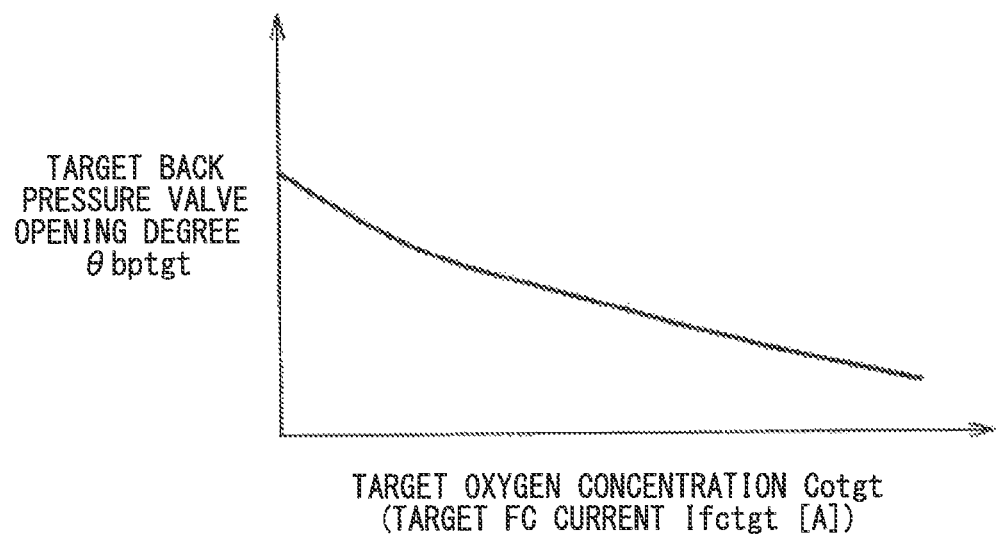
FIG. 17 is a graph showing the relationship between the target oxygen concentration and the target FC current, and the target opening degree of a back pressure valve in the voltage fixed/current variable control.

That is, as shown in FIGS. 16 and 17, the target air pump rotation number Naptgt, the target water pump rotation number Nwptgt, and the target back pressure valve opening degree θbptgt are determined depending on the target oxygen concentration Cotgt (or the target FC current Ifctgt). Further, the target opening degree θctgt of the circulation valve 66 is set to an initial value (opening degree where no circulating gas is present).

In step S35, the ECU 24 determines whether power generation by the FC 40 is stably performed or not. In the determination, if the lowest cell voltage inputted from the cell voltage monitor 42 is lower than the voltage obtained by subtracting a predetermined voltage from the average cell voltage (lowest cell voltage<(average cell voltage−predetermined voltage)), the ECU 24 determines that power generation of the FC 40 is not stable. For example, experimental values, simulation values or the like may be used as the predetermined voltage.

Figure 18:
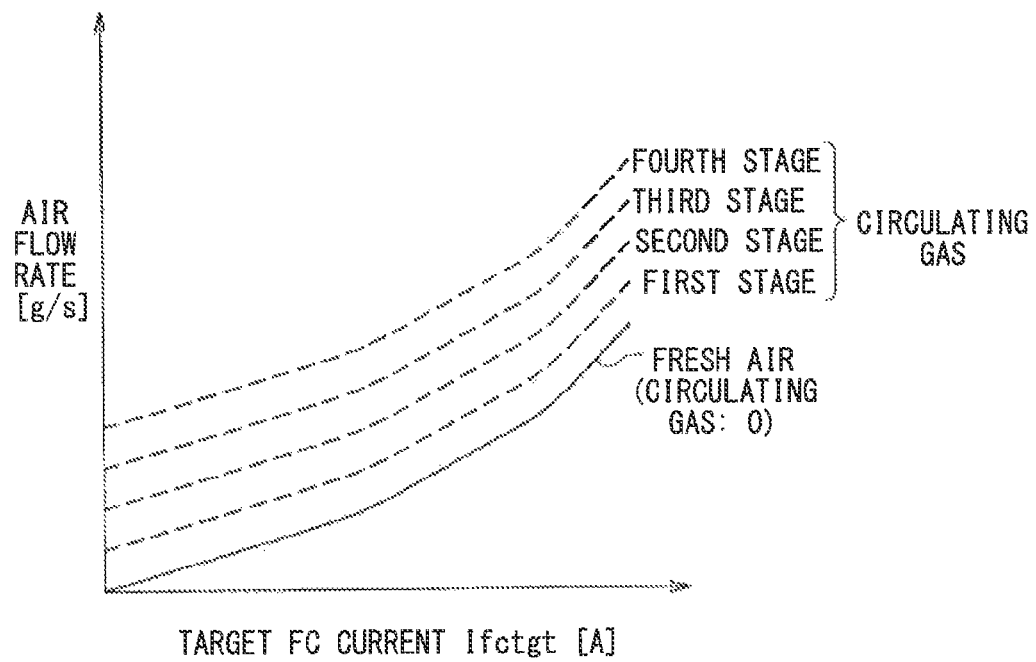
FIG. 18 is a graph showing the relationship between the target FC current and the flow rate of air in the voltage fixed/current variable control.

If power generation is stable (S35: YES), the current process is finished. If power generation is not stable (S35: NO), in step S36, the ECU 24 monitors the flow rate Qc [g/s] of the circulating gas through the flow rate sensor 70, increases the opening degree θc of the circulation valve 66, and increases the flow rate Qc by one stage (see FIG. 18). FIG. 18 shows a case where when the circulation valve 66 is fully opened, the flow rate Qc is increased to the fourth stage, to the maximum flow rate.

When the opening degree θc of the circulation valve 66 is increased, in the suction gas sucked into the air pump 60, the proportion of the circulating gas is increased. That is, in the suction gas, the proportion of the circulating gas is increased in the ratio between the fresh air (air sucked from the outside of the vehicle) and the circulating gas. Therefore, improvement in the capability of distributing oxygen to all the unit cells is achieved. The oxygen-concentration Co of the circulating gas (cathode off gas) is low in comparison with the oxygen concentration Co of the fresh air. Therefore, if the rotation number Nap of the air pump 60 and the opening degree θbp of the back pressure valve 64 are the same before and after control of the opening degree θc of the circulation valve 66, the oxygen concentration Co of the gas flowing through the cathode channel 74 is decreased.

Thus, in step S36, preferably, at least one of the control to increase the rotation number Nap of the air pump 60 and the control to decrease the opening degree θbp of the back pressure valve 64 is implemented in association with the increase in the flow rate Qc of the circulating gas such that the target oxygen concentration Cotgt calculated in step S33 is maintained.

For example, in the case where the flow rate Qc of the circulating gas is increased, it is preferable to increase the rotation number Nap of the air pump 60 thereby to increase the flow rate of the fresh air. By this operation, since the flow rate of the gas (mixed gas of the fresh air and the circulating gas) flowing toward the cathode channel 74 is increased as a whole, further improvement in the capability of distributing oxygen to all the unit cells is achieved, and the power generation performance of the FC 40 can be recovered easily.

In this manner, since the circulating gas is merged with the fresh air while the target oxygen concentration Cotgt is maintained, the volume flow rate [L/s] of the gas flowing through the cathode channel 74 is increased. Thus, since the volume flow rate of the gas is increased while the target oxygen-containing gas concentration Cotgt is maintained, the gas can be distributed smoothly to the entire cathode channel 74 formed in the FC 40 in a complicated manner. The gas can also be supplied to each of the unit cells easily, and instable power generation of the FC 40 can be avoided easily. Further, water droplets (e.g., condensed water) attached to surfaces of MEAs (membrane electrode assemblies) or wall surfaces surrounding the cathode channel 74 can be removed easily.

In step S37, the ECU 24 determines whether or not the flow rate Qc of the circulating gas detected by the flow rate sensor 70 is equal to or more than the upper limit value. The upper limit value serving as the determination criterion is set to a value where the opening degree θc of the circulation valve 66 is fully opened.

In this case, even in a case where the opening degree θc of the circulation valve 66 does not change, if the rotation number Nap of the air pump 60 is increased, the flow rate Qc of the circulating gas detected by the flow rate sensor 70 is increased. Therefore, preferably, the upper limit value is associated with the air pump rotation number Nap, that is, if the rotation number Nap of the air pump 60 becomes large, the upper limit value is increased.

If it is determined that the flow rate Qc of the circulating gas is less than the upper limit (S37: NO), the process returns to step S35. If it is determined that the flow rate Qc of the circulating gas is equal to or more than the upper limit (S37: YES), the process proceeds to step S38.

In steps S36 and S37, the process is carried out based on the flow rate Qc of the circulating gas detected directly by the flow rate sensor 70. Alternatively, the process may be carried out based on the circulation valve opening degree θc. That is, in step S36, the circulating valve opening degree θc may be increased in increments of one stage (e.g., 30°), and in step S37, if the circulation valve 66 is fully opened (S37:YES), the process may proceed to step S38.

Figure 19:
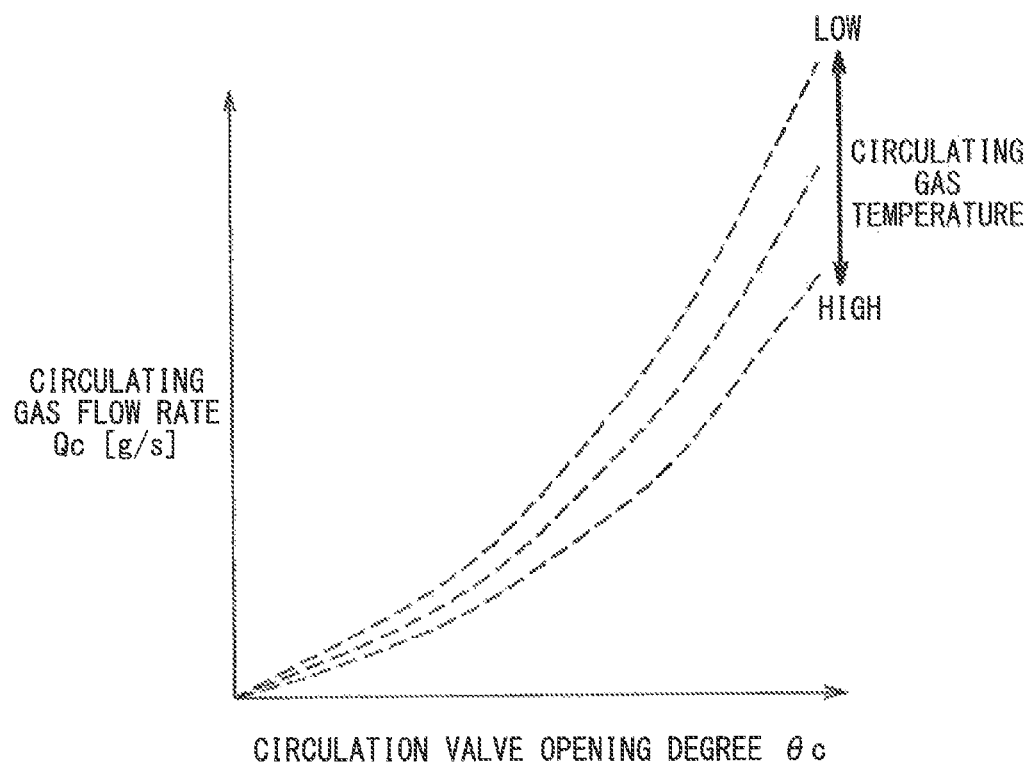
FIG. 19 is a graph showing the relationship between the opening degree of a circulation valve and the flow rate of a circulating gas in the voltage fixed/current variable control.

Further, in this case, the flow rate Qc [g/s] of the circulating gas may be calculated based on the opening degree θc of the circulation valve 66, the temperature of the circulating gas, and the map in FIG. 19. In the relationship shown in FIG. 19, as the temperature of the circulating gas increases, the density of the circulating gas becomes low, and thus the flow rate Qc [g/s] becomes low.

In step S38, in the same manner as step S35, the ECU 24 determines whether or not power generation is performed stably. If power generation is performed stably (S38: YES), the current process is finished. If power generation is not performed stably (S38: NO), in step S39, the ECU 24 increase the target oxygen concentration Cotgt by one stage (closer to the normal concentration). More specifically, at least one of increasing the rotation number Nap of the air pump 60 and decreasing the opening degree θbp of the back pressure valve 64 is performed by one stage.

In step S40, the ECU 24 determines whether or not the target oxygen concentration Cotgt is equal to or less than the target oxygen concentration of the normal I-V characteristic (normal oxygen concentration. Conml). If the target oxygen concentration Cotgt is equal to or less than the normal oxygen concentration Conml (S40: YES), the process returns to step S38. If the target oxygen concentration Cotgt is more than the normal oxygen concentration Conml (S40: NO), in step S41, the ECU 24 stops operation of the FC unit 18. That is, the ECU 24 stops supply of hydrogen and air to the FC 40 thereby to stop power generation of the FC 40. Then, the ECU 24 turns on an alarming lamp (not shown) to notify the operator that there is a failure in the FC40. It should be noted that the ECU 24 supplies electric power from the battery 20 to the motor 14 for allowing the FC vehicle 10 to continue running.

In the voltage fixed/current variable control as described above, in the case where the system load Psys low or during regeneration, by adjusting the oxygen concentration Co (cathode stoichiometric ratio) while keeping the cell voltage Vcell at a constant level, basically, the entire system load Psys can be covered with the FC electric power Pfc.

[2-4. FC Power Generation Control]

As described above, as FC power generation control (S4 of FIG. 5), the ECU 24 controls peripheral devices of the FC stack 40, i.e., the air pump 60, the back pressure valve 64, the circulation valve 66, and the water pump 80. Specifically, the ECU 24 controls these devices using instruction values (e.g., S34 of FIG. 14) calculated in energy management (S3 of FIG. 5).

[2-5. Torque Control of Motor 14]

Figure 20:
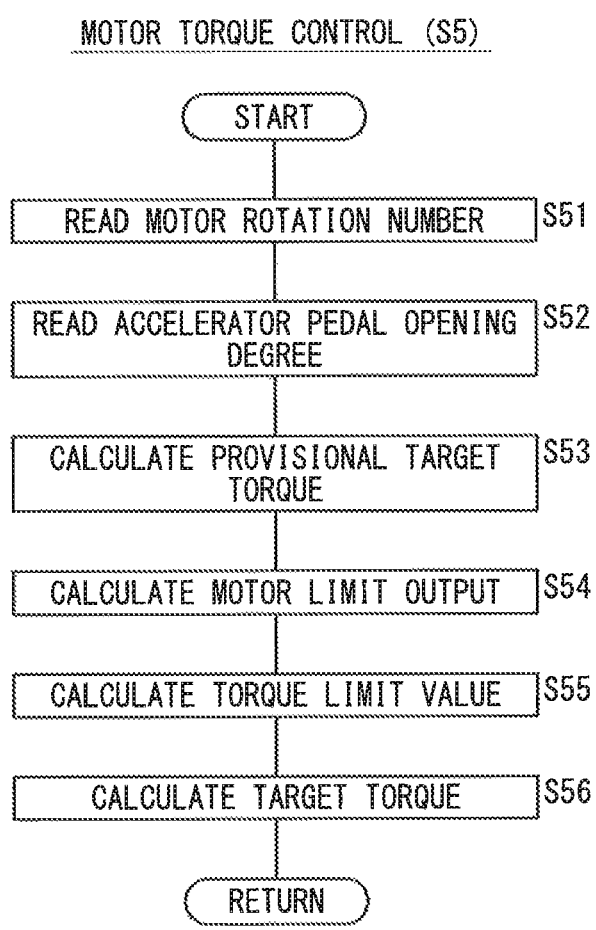
FIG. 20 is a flow chart showing torque control of the motor.

FIG. 20 is a flow chart of torque control of the motor 14. In step S51, the ECU 24 reads the motor rotation number Nm from the rotation number sensor 152. In step S52, the ECU 24 reads the opening degree θp of the accelerator pedal 154 from the first opening degree sensor 150.

In step S53, the ECU 24 calculates the provisional target torque Ttgt_p [N·m] of the motor 14 based on the motor rotation number Nm and the opening degree θp. Specifically, a map of data indicating association of the rotation number Nm and the opening degree θp with the provisional target torque Ttgt_p is stored in memory means (not shown), and the provisional target torque Ttgt_p is calculated based on the map, the rotation number Mm, and the opening degree θp.

In step S54, the ECU 24 calculates a limit output (motor limit output Pm_lim) [W] of the motor 14, which is equal to the limit value (limit supply electric power Ps_lim) [W] of the electric power which can be supplied from the FC system 12 to the motor 14. Specifically, the limit supply electric power Ps_lim and the motor limit output Pm_lim can be calculated by subtracting electric power Pa consumed by the auxiliary devices from the sum of the FC electric power Pfc from the FC stack 40 and the limit value (limit output Pbat_lim) [W] of electric power which can be supplied from the battery 20 (Pm_lim=Ps_lim←Pfc+Pbt_lim−Pa).

In step S55, the ECU 24 calculates the torque limit value Tlim [N·B] of the motor 14. Specifically, a value calculated by dividing the motor limit output Pm_lim by the vehicle velocity V is used as the torque limit value Tlim (Tlim←Pm_lim/V).

In step S54, if the ECU 24 determines that the motor 14 is regenerating electric power, the ECU 24 calculates a limit supply regenerative electric power Ps_reglim. The limit supply regenerative electric power Ps_reglim is calculated by subtracting electric power Pa consumed by the auxiliary devices from the sum of the limit value of electric power with which the battery 20 can be charged (limit charging electric power Pbat_chglim) and the FC electric power Pfc from the FC stack 40 (Pm_reglim=Pbat_chglim+Pfc−Pa). During regeneration of electric power, in step S55, the ECU 24 calculates the regenerative torque limit value Treglim (N·M) of the motor 14. Specifically, a value calculated by dividing the limit supply regenerative electric power Ps_reglim by the vehicle velocity Vs (Tlim←Ps_reglim/Vs) is defined as the torque limit value Tlim.

In step S56, the ECU 24 calculates the target torque Ttgt [N·m]. Specifically, the ECU 24 determines the target torque Ttgt by adding a limitation based on the torque limit value Tlim to the provisional target torque Ttgt_p. For example, if the provisional target torque Ttgt_p is equal to or less than the torque limit value Tlim (Ttgt_p≤Tlim), the provisional target torque Ttgt_p is directly used as the target torque Ttgt (Ttgt←Ttgt_p). If the provisional target torque Ttgt_p exceeds the torque limit value Tlim (Ttgt_p>Tlim), the torque limit value Tlim is used as the target torque Ttgt (Ttgt←Tlim).

Then, the motor 14 is controlled using the calculated target torque Ttgt.

3. Examples of Various Controls

Figure 21:
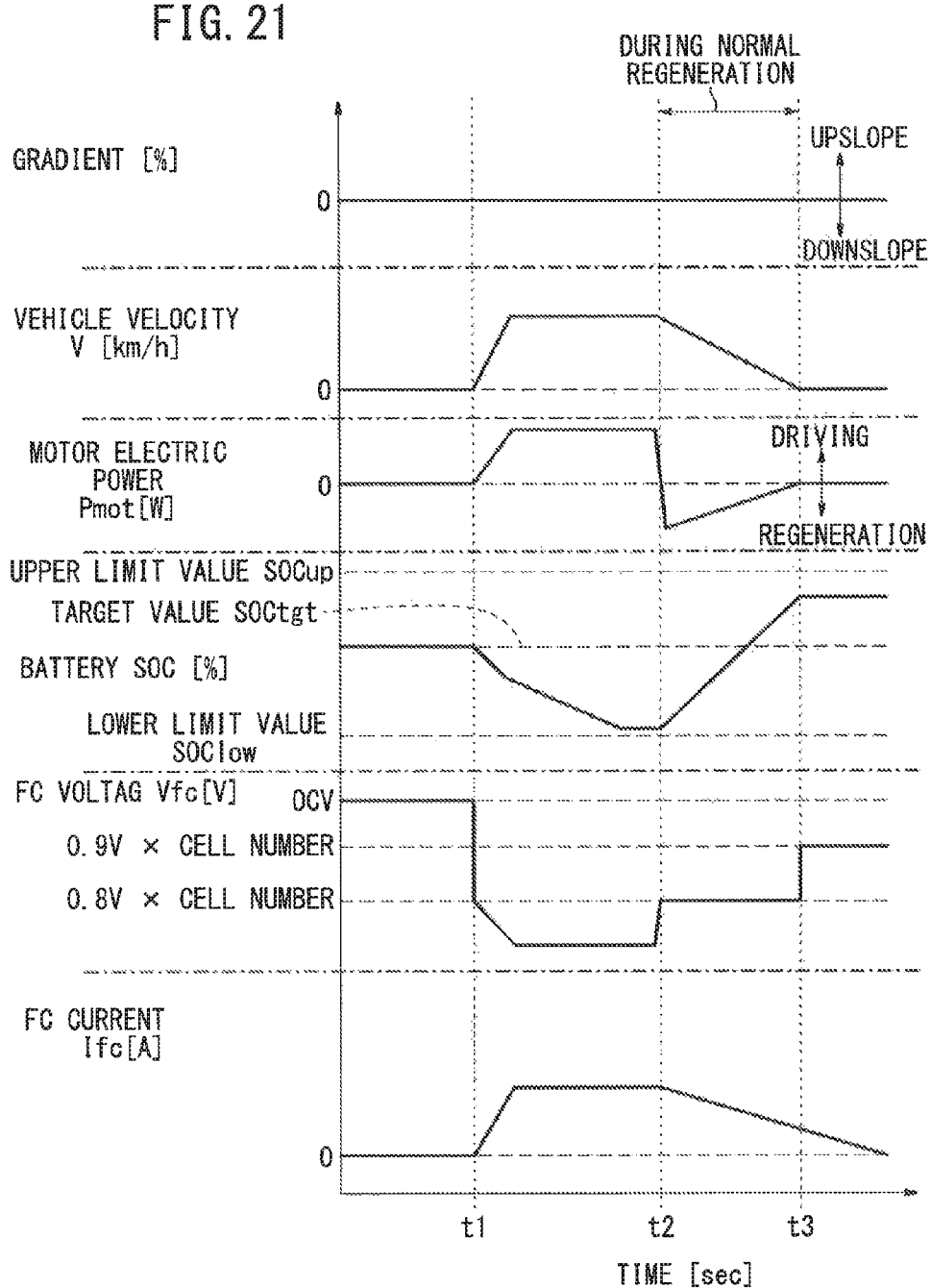
FIG. 21 is an example of time chart in the case of using various controls according to the embodiment during normal regeneration.

FIG. 21 is an example of time chart showing a case of using various controls according to the embodiment of the present invention during normal regeneration. In FIG. 21, "GRADIENT" means the gradient of a road on which the vehicle 10 travels (Also in FIG. 22, "GRADIENT" has the same meaning.). Further, the "MOTOR ELECTRIC POWER Pmot" is the sum of electric power of the motor 14 consumed during driving of the motor 14 (during the power running state of the vehicle 10) and the regenerative electric power Preg of the motor 14 during regeneration of electric power by the motor 14 (during regeneration of the vehicle 10) (Also in FIG. 22, "MOTOR ELECTRIC POWER" has the same meaning.).

The vehicle 10 is stopped before time t1. Therefore, the vehicle velocity V is zero, and the motor electric power Pmot, the battery SOC, the FC voltage Vfc, and the FC current Ifc are maintained constant. The FC voltage Vfc before time t1 is set to OCV. Further, in FIG. 21, the vehicle 10 is on a flat road (gradient is 0%) all the time.

At time t1, the vehicle 10 starts traveling. From time t1 up to a point around time t2, the vehicle velocity V, the motor electric power Pmot, and the FC current Ifc are increased gradually and the battery SOC is decreased gradually. Further, after the FC voltage Vfc decreases from OCV to 0.8 V×cell number, the voltage variable/current variable control is implemented (It is preferable to implement rate limit control as described above.).

At a point immediately before time t2, for example, the brake pedal 155 is depressed, and deceleration of the vehicle 10 is started. The motor electric power Pmot is switched from a positive value to a negative value at a point around time t2, and the motor 14 is switched from the driving state to the regenerative state. Accordingly, the FC voltage Vfc is fixed to the electric potential 0.8 V×cell number (see S28 in FIG. 11). Then, charging of the battery 20 with the regenerative electric power Preg from the motor 14 is started.

From time t2 to time t3, the motor 14 is in the regenerative state (normal regenerative state). At time t3, the vehicle 10 is stopped, and the vehicle velocity V and the motor electric power Pmot become zero.

Figure 22:
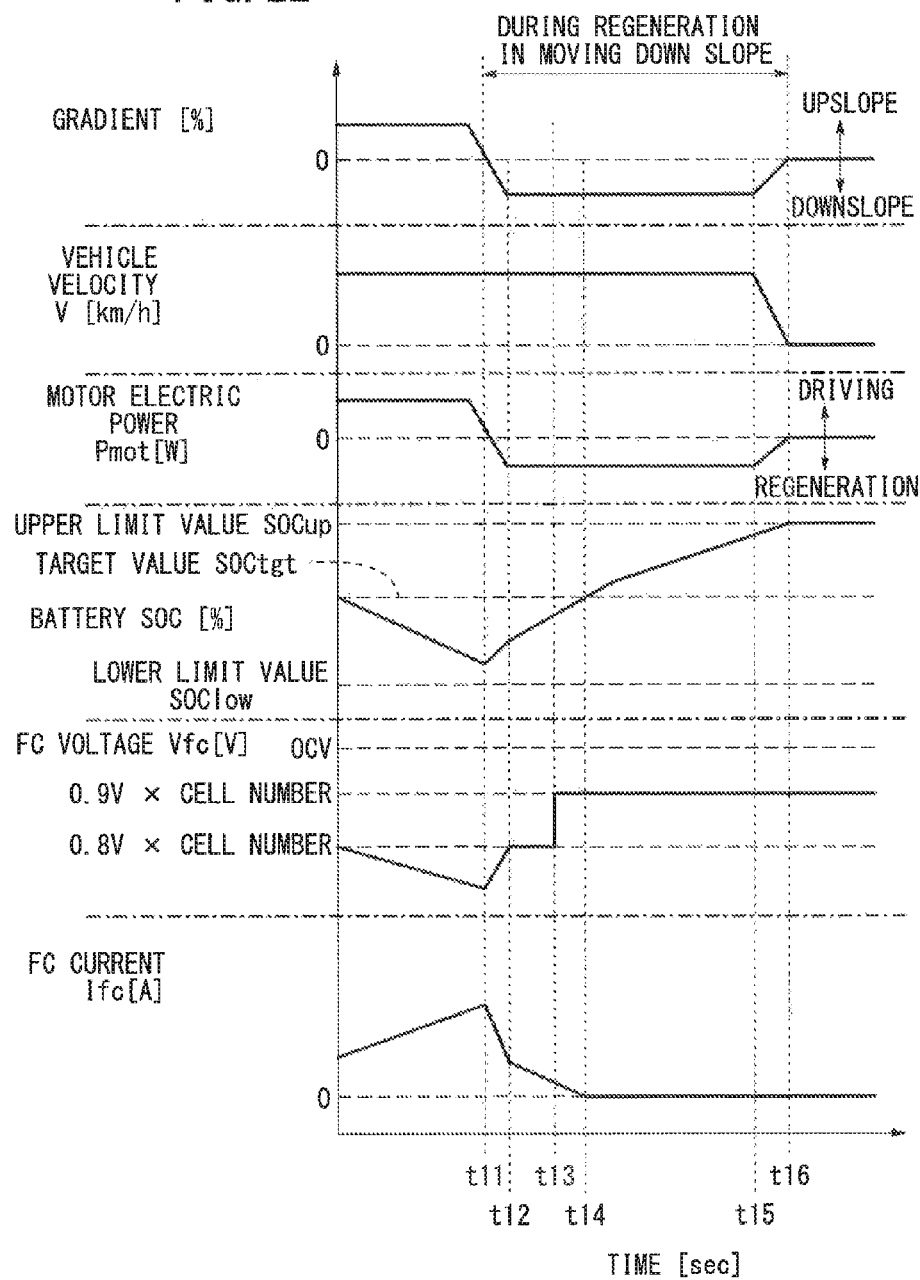
FIG. 22 is an example of time chart in the case of using various controls according to the embodiment during regeneration in moving down a slope.

FIG. 22 is an example of time chart of an example in the case of using various controls according to the embodiment of the present invention during regeneration of electric power while the vehicle 10 is moving down a slope. Before time t11, the gradient is larger than 0%, and the vehicle 10 is traveling on an upslope. Accordingly, the battery SOC and the FC voltage Vfc are decreased, and the FC current Ifc is increased.

From a point immediately before time t11, the gradient starts to be decreased gradually. At time t11, the gradient becomes zero, and thereafter, the gradient has a negative value. Around time t11, the road on which the vehicle 10 travels changes from the upslope to the downslope. Accordingly, the motor electric power Pmot is also switched from a positive value to a negative value, and the motor 14 is switched from the driving state to the regenerative state. Further, as a result of regenerating electric power by the motor 14, since the regenerative electric power Preg is supplied to the battery 20 for charging, after time t12, the SOC is increased gradually. Further, from time t11, the FC voltage Vfc is increased, and at time 12, the FC voltage Vfc is set to 0.8 V×cell number (S28 in FIG. 11). Additionally, the FC current Ifc is decreased sharply from time t11.

Though not shown, from time t12 to time t13, the target FC electric power Pfctgt is larger than the threshold value THP2 and equal to or smaller than the threshold value THP1 (S26 YES→S27: NO), and the FC voltage Vfc is fixed to 0.8 V×cell number (S28).

At time t13, the target FC electric power Pfctgt becomes the threshold value THP2 or less (S26 YES→S27: YES), and the FC voltage Vfc is fixed to 0.9 V×cell number (S29).

The FC current Ifc decreased from time t11 becomes zero at time t14. By decreasing the FC current Ifc in this manner, the battery 20 is allowed to efficiently collect (be charged with) the regenerative electric power Preg of the motor 14.

The gradient of the road is increased gradually from time t15. At time t16, the gradient becomes 0% (flat road). Further, from time t15, the vehicle velocity V and the motor electric power Pmot are decreased gradually, and become zero at time t16.

In the flow chart of FIG. 11 and the characteristic curve of FIG. 12, during regeneration of electric power by the motor 14 while the vehicle 10 is moving down a slope, the target FC electric power Pfctgt is set to the minimum value Pfcmin, and the target FC voltage Vfctgt is fixed to 0.9 V×cell number. However, in a time chart of FIG. 22, from time t11 to time t13 during regeneration of electric power in moving down a slope (t11 to t16), the FC voltage Vfc is not 0.9 V×cell number. This is because the rate limit control is implemented in order to avoid sharp changes in the FC voltage Vfc as described above.

4. Advantages of the Present Embodiment

As described above, in the embodiment of the present invention, it becomes possible to effectively collect regenerative electric power Preg while suppressing degradation of the FC 40.

That is, in the present embodiment, during regeneration, the FC voltage Vfc is set to a voltage value (0.8 V×cell number or 0.9 V×cell number) outside the oxidation reduction region R3. Thus, it becomes possible to suppress degradation of the FC 40.

Further, in the present embodiment, during regeneration, the target FC electric power Pfctgt is set based on the battery SOC (FIG. 12), and the target oxygen concentration Cotgt is changed depending on the target FC electric power Pfctgt (target FC current Ifctgt) (S28 and S29 in FIG. 11). Further, in comparison with the case where it is determined that the motor 14 is in the normal regeneration (e.g., regenerating electric power while the vehicle is decelerated on a flat road), in the case where it is determined that the motor 14 is regenerating electric power while the vehicle 10 is moving down a slope, by decreasing the target FC electric power Pfctgt, the target oxygen concentration Cotgt is decreased. Therefore, even when the battery SOC is the same, the FC electric power Pfc is small in the case of regeneration of electric power in moving down a slope, in comparison with the case of the normal regeneration.

In general, it is highly probable that regeneration of electric power while the vehicle 10 is moving down a slope continues for a long period of time in comparison with the case of regeneration of electric power while the vehicle 10 is decelerated on a flat road. Further, while the vehicle 10 is moving down a slope, the potential energy of the vehicle 10 is converted into regenerative electrical energy. Therefore, it is considered that the regenerative electric power Preg tends to be large. Thus, in the case of regeneration of electric power while the vehicle 10 is moving down a slope, relatively large electric power can be supplied to the battery 20 for charging. When the FC 40 performs power generation separately from the motor 14, as a consequence, the battery 20 cannot be easily charged with the regenerative electric power Preg, and the efficiency of collecting the regenerative electric power Preg may be lowered undesirably. In the present embodiment, in the case where the motor is regenerating electric power while the vehicle is moving down a slope, the target FC electric power Pfctgt and the target oxygen concentration Cotgt are decreased, and the FC electric power Pfc is decreased. Therefore, while the vehicle 10 is moving down a slope, the battery 20 can be charged with larger regenerative electric power Preg.

Further, in the case where the target value SOCtgt of the battery SOC is set, and charging/discharging of the battery 20 is controlled such that the SOC becomes equal to the target value SOCtgt, if the output of the FC 40 is maintained, for example, the battery 20 may be charged excessively with regenerative electric power Preg regenerated while the vehicle 10 is moving down a slope. In this case, the frequency of charging/discharging of the battery 20 is increased, and electric power loss occurs due to such repeated charging/discharging. As a result, the regeneration efficiency is decreased. In the present embodiment, in the case of regeneration of electric power while the vehicle 10 is moving down a slope, the target FC electric power Pfctgt and the target oxygen concentration Cotgt are decreased, and the FC electric power Pfc is decreased. Thus, since the regenerative electric power Preg with which the battery 20 is charged, instead of the FC electric power Pfc, is increased, the battery SOC can be made closer to the target value SOCtgt easily. Thus, it becomes possible to improve the regeneration efficiency.

In the present embodiment, in the case where it is determined that the motor 14 is in the regeneration of electric power in moving down a slope, the FC voltage Vfc is set to a voltage value (0.9 V×cell number) above the oxidation reduction region R3, and in the case where it is determined that the motor 14 is in the normal regeneration of electric power, the FC voltage Vfc is set to a value (0.8 V×cell number) below the oxidation reduction region R3 or a value (0.9 V×cell number) above the oxidation reduction region R3 depending on the battery SOC (see S28 and S29 in FIG. 11 and FIG. 12).

In general, in the case where the reactant gas is supplied to the FC 40 at the stoichiometric ratio for normal power generation, as the FC voltage Vfc decreases, the output of the FC 40 becomes high. Further, as described above, in the case of regeneration of electric power while the vehicle 10 is moving down a slope, by suppressing the output of the FC 40, it becomes possible to utilize the regenerative electric power Preg further effectively. Further, in the present embodiment, in the case of regeneration of electric power while the vehicle is moving down a slope, by setting a higher FC voltage Vfc, the output of the FC 40 becomes relatively low, and in the case of the normal regeneration of electric power, by setting a lower FC voltage Vfc, the output of the FC 40 becomes relatively high. Thus, during regeneration of electric power while the vehicle is moving down a slope, the target oxygen concentration Cotgt is decreased, and a suitable power generation depending on the target oxygen concentration Cotgt can be performed. As a result, it becomes possible to improve the power generation efficiency of the fuel cell system 12.

5. Modified Embodiment

The present invention is not limited to the above described embodiments. The present invention can adopt various structures based on the description herein. For example, the following structure may be adopted.

[5-1. Application of FC System]

Though the FC system 12 is mounted in the FC vehicle 10 in the above described embodiment, the present invention is not limited in this respect. The FC system 12 may be mounted in other objects that are capable of regenerating electric power in moving down a slope. For example, the FC system 12 may be used in movable objects such as an electric train or an electric bicycle. Further, the case where the regenerative electric power Preg can be obtained is classified into a plurality of different cases, such as cases where larger regenerative electric power Preg can be obtained, and the other cases, and the processes such as the steps S28 and S29 in FIG. 11 may be performed on the respective cases. For example, such cases may include a case where an elevator is moving down and cases where other braking forces are applied, or a case where a crane is moving down and cases where other braking forces are applied.

[5-2. Structure of FC System 12]

Figure 23:
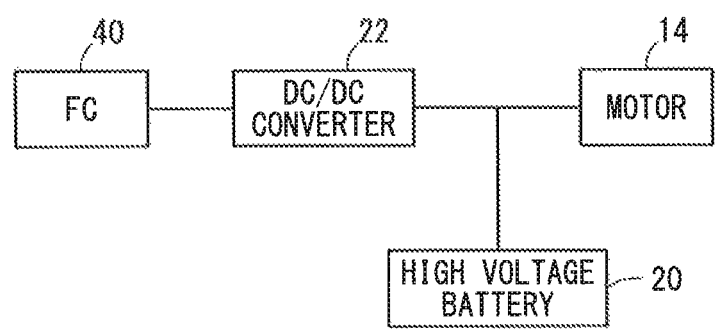
FIG. 23 is a block diagram schematically showing a structure of a first modified example of the fuel cell vehicle according to the embodiment.
Figure 24:
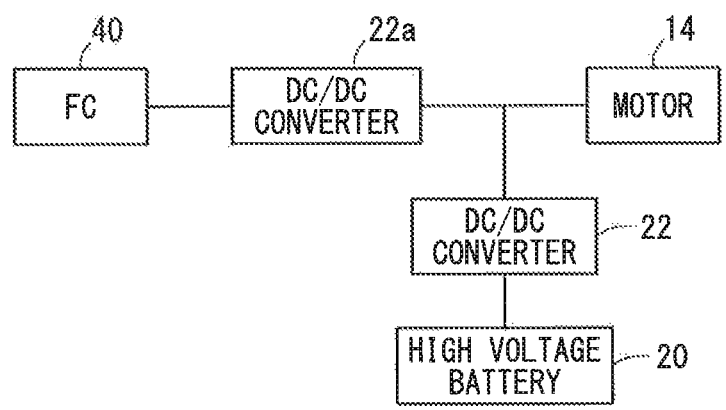
FIG. 24 is a block diagram schematically showing a structure of a second modified example of the fuel cell vehicle according to the embodiment.
Figure 25:
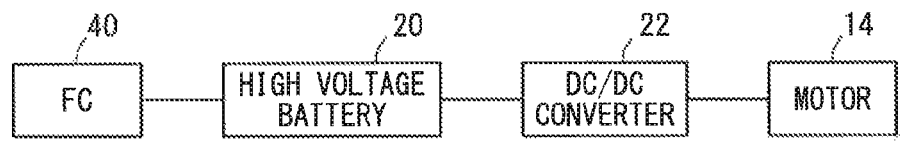
FIG. 25 is a block diagram schematically showing a structure of a third modified example of the fuel cell vehicle according to the embodiment.

In the above embodiment, the FC 40 and the high voltage battery 20 are arranged in parallel, and the DC/DC converter 22 is provided on the near side the battery 20. However, the present invention is not limited in this respect. For example, as shown in FIG. 23, the FC 40 and the battery 20 may be provided in parallel, and a step-up, step-down, or step-up/step-down DC/DC converter 22 may be provided on the near side of the FC 40. Alternatively, as shown in FIG. 24, the FC 40 and the battery 20 may be provided in parallel, a step-up, step-down, or step-up/step-down DC/DC converter 22a may be provided on the near side of the FC 40, and the DC/DC converter 22 may be provided on the near side of the battery 20. Alternatively, as shown in FIG. 25, the FC 40 and the battery 20 may be provided in series, and the DC/DC converter 22 may be provided between the battery 20 and the motor 14.

In the above embodiment, the regenerative electric power Preg from the traction motor 14 is supplied to the battery 20 for charging. However, as long as an electric storage device is charged with regenerative electric power from a regenerative power source, the present invention is not limited in this respect. For example, instead of the traction motor 14, a motor dedicated for regeneration may be used.

[5-3. Stoichiometric Ratio]

In the above described embodiment, a means or a method of adjusting the stoichiometric ratio is performed by adjusting the target oxygen concentration Cotgt. However, the present invention is not limited in this respect. Alternatively, target hydrogen concentration may be adjusted. Further, instead of the target concentration, the target flow rate, or both of the target concentration and the target flow rate may be adjusted.

In the above described embodiment, a structure including the air pump 60 for supplying air containing oxygen is illustrated. Alternatively or additionally, a structure including a hydrogen pump for supplying hydrogen may be adopted.

[5-4. Power Generation Control of FC 40]

In the above embodiment, as power generation control of the FC 40, voltage variable/current variable control and voltage fixed/current variable control are used. However, the present invention is not limited in this respect. The present invention is applicable as long as at least voltage fixed/current variable control is used.

In the above embodiment, the target FC voltage Vfctgt in voltage fixed/current variable control is set to the electric potential v2 (=0.8 V)×cell number or the electric potential v3 (=0.9 V)×cell number. However, the present invention is not limited in this respect. The target FC voltage Vfctgt within the voltage fixed/current variable control may be set to, e.g., another electric potential in the reduction region R2 or the oxidation region R4. In particular, in the characteristics of the motor 14, if there are any voltages where the battery 20 can be easily charged with regenerative electric power Preg (voltage having a high regeneration efficiency), the target FC voltage Vfctgt in the voltage fixed/current variable control may be set to the voltage, or set approximately to the voltage. Further, the target FC voltage Vfctgt may not necessarily have a fixed value. The target FC voltage Vfctgt may be changed according to a predetermined pattern, or randomly.

In the above embodiment, the circulation valve opening degree θc, the air pump rotation number Nap, and the back pressure valve opening degree θbp are variable in order to control the oxygen concentration Co in the voltage fixed/current variable control. However, the present invention is not limited as long as the oxygen-concentration Co can be controlled. For example, the air pump rotation number Nap may be fixed, while the circulation valve opening angle θc may be changed. Thus, since the sound from the air pump 60 is outputted at a fixed level, it becomes possible to prevent the passengers from feeling a sense of discomfort which may be provided if the output sound varies.

In the above embodiment (S21 in FIG. 11), it is determined whether or not the motor 14 (or the vehicle 10) is in the middle of regenerating electric power. However, it is not necessarily required to determine whether or not the motor 14 is regenerating electric power. Alternatively, it may be predicted whether or not the motor 14 will start regeneration of electric power shortly. For such regeneration prediction, for example, map information of a navigation apparatus, information from outside (e.g., information from optical beacons at road sides, or information from base stations or servers capable of communicating information via wireless communication) may be used.

While the invention has been particularly shown and described with reference to preferred embodiments, it will be understood that variations and modifications can be effected thereto by those skilled in the art without departing from the spirit of the invention as defined by the appended claims.

What is claimed is:

1. A method of controlling a fuel cell system, comprising the step of:

implementing regeneration-time voltage fixed control where during regeneration or when regeneration is expected to occur, output voltage of a fuel cell is fixed to a voltage value outside an oxidation reduction progress voltage range where oxidation reduction proceeds, and the amount of a reactant gas supplied to the fuel cell is changed based on the amount of electric power remaining in an energy storage device, wherein in the regeneration-time voltage fixed control, it is determined whether or not regeneration occurs while a moving body equipped with the fuel cell system is moving down a slope, and in the case where it is determined that regeneration occurs while the moving body is moving down a slope, the amount of the reactant gas supplied to the fuel cell is decreased in comparison with the case where it is determined that regeneration occurs while the moving body is not moving down a slope, wherein in the case where it is determined that the regeneration occurs while the moving body is moving down a slope, a target fuel cell electric power is set to a maximum value if the amount of electric power remaining in the energy storage device is lower than a lower limit setting value, and the target fuel cell electric power is set to a minimum value regardless of the amount of electric power remaining in the energy storage device as long as the amount is above the lower limit setting value.

2. The method of controlling the fuel cell system according to claim 1, wherein in the case where it is determined that regeneration occurs while the moving body is moving down a slope, the output voltage of the fuel cell is set to a voltage value which is higher than the oxidation reduction progress voltage range, and in the case where it is determined that regeneration occurs while the moving body is not moving down a slope, the output voltage of the fuel cell is set to a value which is lower or higher than the oxidation reduction progress voltage range, depending on the amount of electric power remaining in the energy storage device.

* * * * *